US012207067B2

(12) United States Patent
Huang

(10) Patent No.: US 12,207,067 B2
(45) Date of Patent: Jan. 21, 2025

(54) MULTI-CHANNEL AUDIO PLAYBACK SYSTEM

(71) Applicant: Shih-Chieh Huang, Hsinchu County (TW)

(72) Inventor: Shih-Chieh Huang, Hsinchu County (TW)

( * ) Notice: Subject to any disclaimer, the term of this patent is extended or adjusted under 35 U.S.C. 154(b) by 259 days.

(21) Appl. No.: 17/971,830

(22) Filed: Oct. 24, 2022

(65) Prior Publication Data

US 2023/0412980 A1 Dec. 21, 2023

(30) Foreign Application Priority Data

Jun. 21, 2022 (TW) ................................. 111123086

(51) Int. Cl.

| | |
|---|---|
| ***H04R 5/00*** | (2006.01) |
| ***H04R 1/26*** | (2006.01) |
| ***H04R 3/12*** | (2006.01) |
| ***H04R 5/02*** | (2006.01) |
| ***H04R 5/04*** | (2006.01) |
| ***H04S 3/00*** | (2006.01) |
| ***H04S 7/00*** | (2006.01) |

(52) U.S. Cl.

CPC ................ *H04R 5/02* (2013.01); *H04R 1/26* (2013.01); *H04R 3/12* (2013.01); *H04R 5/04* (2013.01); *H04S 3/002* (2013.01); *H04S 7/30* (2013.01); *H04R 2205/024* (2013.01); *H04S 2400/05* (2013.01)

(58) Field of Classification Search

CPC ... H04R 5/02; H04R 1/26; H04R 5/04; H04R 3/12; H04S 3/002; H04S 7/30

See application file for complete search history.

(56) References Cited

U.S. PATENT DOCUMENTS

| | | | | |
|---|---|---|---|---|
| 10,805,729 | B2 | 10/2020 | Lam et al. | |
| 2003/0185404 | A1* | 10/2003 | Milsap | H04S 7/303 381/79 |
| 2005/0169488 | A1* | 8/2005 | Kato | H04S 7/302 381/98 |
| 2021/0243544 | A1 | 8/2021 | Tracey et al. | |

* cited by examiner

*Primary Examiner* — Rasha S Al Aubaidi

(74) *Attorney, Agent, or Firm* — RABIN & BERDO, P.C.

(57) ABSTRACT

A multi-channel audio playback system includes a front speaker, a wearable speaker, and a signal processor. The front speaker is configured to receive front sound field signals (FS). The wearable speaker is designed to allow a listener to hear environmental sounds and is configured to receive rear sound field signals (RS). The signal processor is configured to divide a multi-channel signal into a front sound field signal group (FSG) and a rear sound field signal group (RSG); mix FSG (RSG) and generate the FS (RS), wherein the number of the FS (RS) is equal to the number of the drivers of the front speaker (wearable speaker); and perform time delay adjustment on FS or RS, so that a difference between times for sound waves emitted by the front speaker and by the wearable speaker to respectively reach ears of the listener is less than a default value.

13 Claims, 19 Drawing Sheets

MULTI-CHANNEL AUDIO PLAYBACK SYSTEM

CROSS-REFERENCE TO RELATED APPLICATION

This non-provisional application claims priority under 35 U.S.C. § 119(a) to Patent Application No. 111123086 filed in Taiwan, R.O.C. on Jun. 21, 2022, the entire contents of which are hereby incorporated by reference.

BACKGROUND

Technical Field

The instant disclosure is related to an audio playback system, especially a multi-channel audio playback system designed to generate surround sound field.

Related Art

A multi-channel system known to the inventor adopts multiple speakers to generate a surround sound field. The positions of the speakers are important in the quality of sound reproduction and size of sound field of the multi-channel system. The International Telecommunication Union Radiocommunication Sector standard ITU-R BS.775 defines the configuration of 5.1 surround sound systems, where the speaker configuration of front sound field is more emphasized. The CTA/CEDIA-CEB22-A Multi-Channel Audio Room Design Recommended Practice edited by Custom Electronics Design and Installation Association (CEDIA) further defines the configuration of 7.1 surround sound systems. The 7.1 surround sound system is a modification of the 5.1 surround sound system where the positions of the left and right surround speakers are slightly moved toward the back of the listener, so that a surround sound effect can be improved.

However, the cost of adopting the foregoing multi-speaker configuration is quite high, for the speakers of the multi-channel system take up more space, and the installation and wiring for the speakers is quite complicated.

SUMMARY

In view of this, one embodiment of the instant disclosure provides a multi-channel audio playback system comprising a front one-box speaker, a wearable speaker, and a signal processor. The front one-box speaker comprises at least two drivers configured to receive at least two front sound field signals. The wearable speaker comprises at least two drivers, the wearable speaker is designed to allow a listener to hear environmental sounds, and the wearable speaker is configured to receive at least two rear sound field signals. The signal processor is configured to: receive a multi-channel signal; divide the multi-channel signal into a front sound field signal group and a rear sound field signal group; mix the front sound field signal group to generate a plurality of front sound field signals, wherein the number of the front sound field signals is equal to the number of the drivers of the front one-box speaker; mix the rear sound field signal group to generate a plurality of rear sound field signals, wherein the number of the rear sound field signals is equal to the number of the drivers of the wearable speaker; perform time delay adjustment on the front sound field signals or the rear sound field signals, so that a difference between a time for a sound wave emitted by the front one-box speaker to reach ears of the listener and a time for a sound wave emitted by the wearable speaker to reach the ears of the listener is less than a default value; and output the front sound field signals to the front one-box speaker and output the rear sound field signals to the wearable speaker.

BRIEF DESCRIPTION OF THE DRAWINGS

The disclosure will become more fully understood from the detailed description given herein below for illustration only, and thus not limitative of the disclosure, wherein.

DETAILED DESCRIPTION

In order to reduce the number of speakers in a multi-channel system, adopting a one-box speaker is a solution with good tradeoffs. Take the soundbar for example, it is equipped with a plurality of drivers and thus has the advantage of small size, especially for environments with insufficient indoor space. Although a multi-channel soundbar is able to generate a front sound field, independent and properly positioned surround speakers are still missing in the system, especially speakers positioned behind the listener. As a result, the generated sound field is limited to the front space, the feeling of surround and immersive sound field cannot be achieved.

Figure 1:
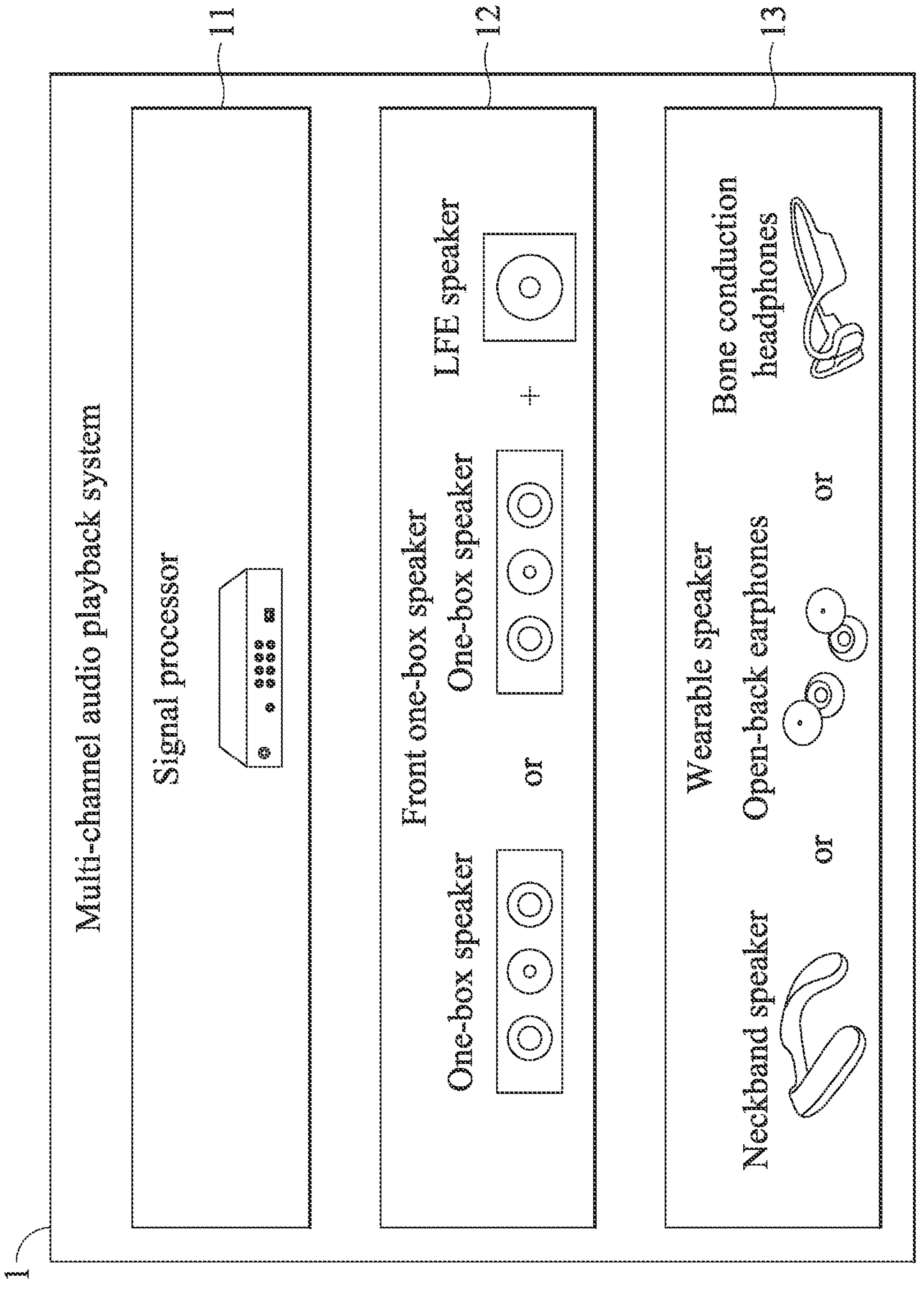
FIG. 1 illustrates a schematic diagram of a multi-channel audio playback system according to some exemplary embodiments of the instant disclosure.

Please refer to FIG. 1. FIG. 1 illustrates a schematic diagram of a multi-channel audio playback system according to some exemplary embodiments of the instant disclosure. According to some embodiments of the instant disclosure, the multi-channel audio playback system 1 comprises a signal processor 11, a front one-box speaker 12, and a wearable speaker 13. The signal processor 11 may be implemented using a system on a chip (SoC), a central processing unit (CPU), a micro-control unit (MCU), an application specific integrated circuit (ASIC), a field programmable gate array (FPGA), a logic circuit, or the like. For example, the signal processor 11 may be the processing chip of a personal computer, a mobile phone, a tablet computer, or a laptop computer. Besides, the signal processor 11 is not limited to an integrated chip or circuit and may also be the aggregation of a plurality of chips and/or circuits. For example, the signal processor 11 may comprise the processing chip of a mobile phone and the processing chip of a pair of earphones, wherein the two chips perform different steps of signal processing.

The front one-box speaker 12 may be a stereo speaker or a multi-channel speaker which comprises a plurality of drivers integrally configured in a single speaker box, such as a soundbar. In some exemplary embodiments, additional audio signal processing is applied to an audio signal emitted by the front one-box speaker 12 to reduce crosstalk problems (will be illustrated later). In some exemplary embodiments, the front one-box speaker 12 may also be integrated into other electronic devices. For example, the front one-box speaker 12 may be the built-in speakers of a display device.

The wearable speaker 13 may be a neckband speaker designed to be worn on a neck portion of a listener and emit sound waves directed toward the wearer's left and right ears. The neckband speaker may comprise two or more built-in drivers with one or more drivers at each side near the left ear and the right ear, respectively. Alternatively, in some embodiments, the wearable speaker 13 may be a pair of bone conduction headphones designed to generate vibrations that are conducted to the auditory ossicles. Or, in some embodiments, the wearable speaker 13 may also be a pair of open-back earphone designed to emit sound waves and allow the listener to hear the environmental sounds. In some exemplary embodiments, the multi-channel audio playback system 1 may comprise a plurality of wearable speakers 13, and the signal processor 11 transmits identical rear sound field signals to the wearable speakers 13.

Figure 2:
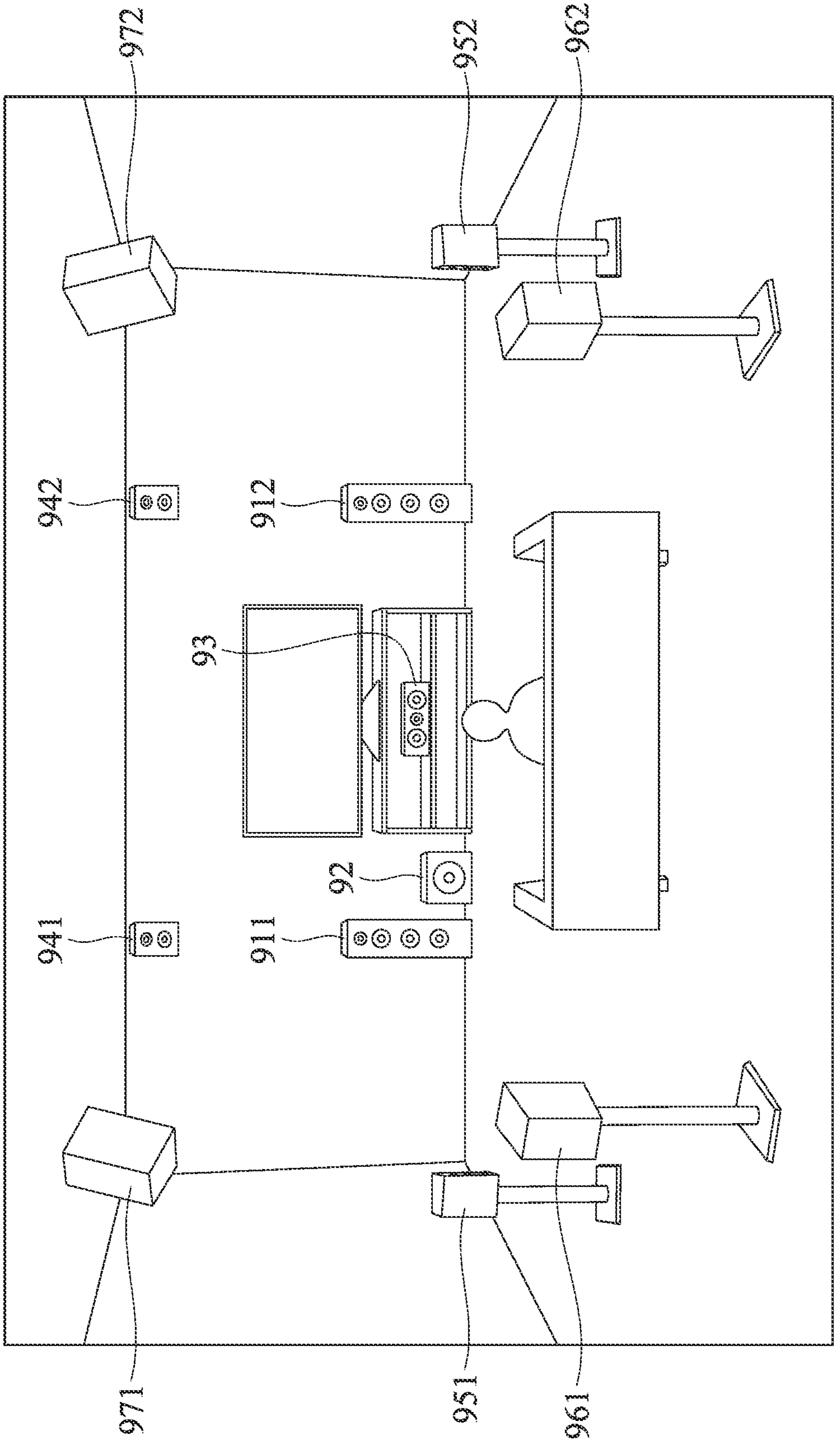
FIG. 2 illustrates a schematic view of a configuration of speakers of a multi-channel system emulated by a multi-channel audio playback system according to some exemplary embodiments of the instant disclosure.
Figure 3:
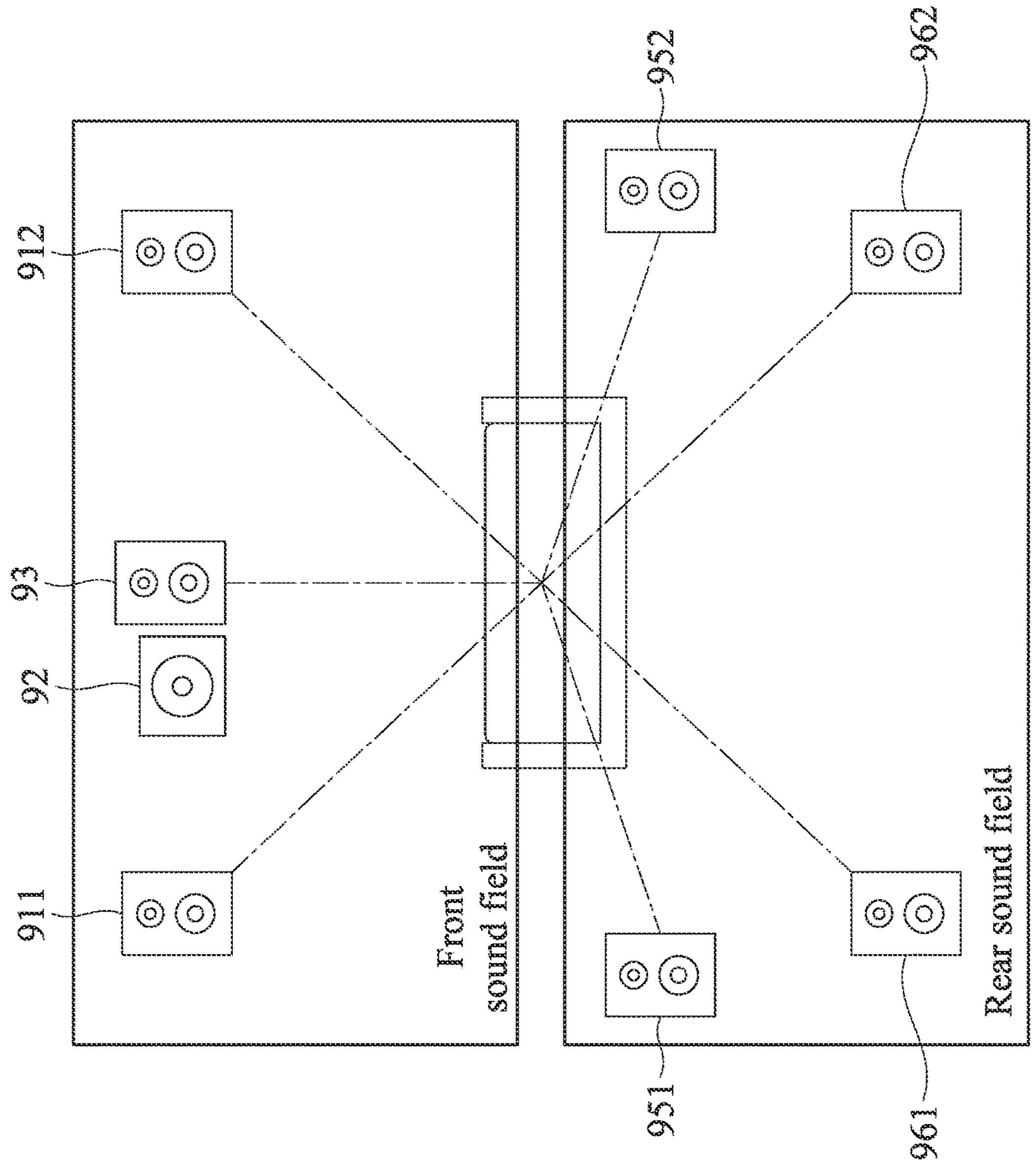
FIG. 3 illustrates a top schematic view of sound field grouping policy for a 7.1ch audio playback system according to some other exemplary embodiments of the instant disclosure.

According to some exemplary embodiments, the sound field generated by the multi-channel audio playback system 1 can emulate a multi-channel system adopting a plurality of independently configured speakers. Please refer to FIG. 2. According to some exemplary embodiments, the multi-channel system comprises a front left speaker 911, a front right speaker 912, a central speaker 93, a subwoofer 92, a front height left speaker 941, a front height right speaker 942, a side left speaker 951, a side right speaker 952, a rear left speaker 961, a rear right speaker 962, a rear height left speaker 971, and a rear height right speaker 972. Each of the speakers of the multi-channel system receives a corresponding audio signal, and the speakers together generate a surround sound field around the listener. Please refer to FIG. 3. According to some exemplary embodiments, the surround sound field is divided into a front sound field and a rear sound field. The front sound field can be generated by the sound waves emitted by the front left speaker 911, the front right speaker 912, the central speaker 93, the subwoofer 92, the front height left speaker 941 (not shown in FIG. 3), and the front height right speaker 942 (not shown in FIG. 3); the rear sound field can be generated by the sound waves emitted by the side left speaker 951, the side right speaker 952, the rear left speaker 961, the rear right speaker 962, the rear height left speaker 971 (not shown in FIG. 3), and the rear height right speaker 972 (not shown in FIG. 3). In this embodiment, the multi-channel audio playback system 1 generates the effect of the front sound field through the front one-box speaker 12 and the effect of the rear sound field through the wearable speaker 13, and details will be illustrated later.

Figure 4:
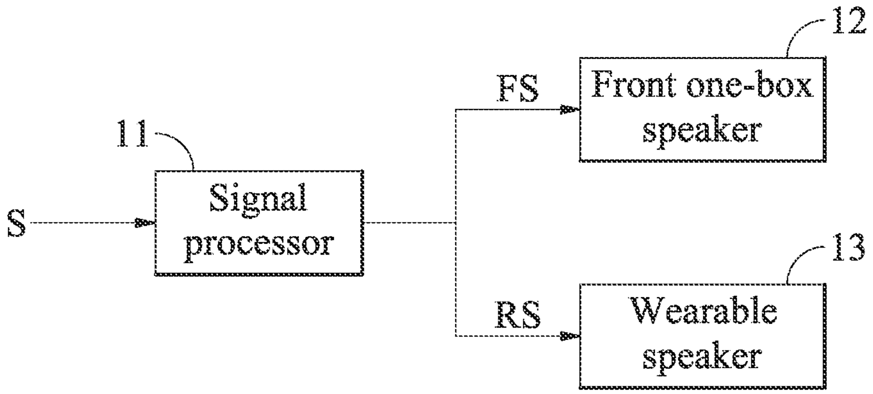
FIG. 4 illustrates a schematic signal flow diagram of a multi-channel audio playback system according to some exemplary embodiments of the instant disclosure.

Please refer to FIG. 4. FIG. 4 illustrates a schematic signal flow diagram of a multi-channel audio playback system according to some exemplary embodiments of the instant disclosure. The signal processor 11 is configured to receive a multi-channel signal S so as to generate a plurality of front sound field signals FS to the front one-box speaker 12 and generate a plurality of rear sound field signals RS to the wearable speaker 13. The front one-box speaker 12 is connected to the signal processor 11, and the wearable speaker 13 is also connected to the signal processor 11, wherein the connection is not limited to wired or wireless connection. In other words, in this embodiment, the front sound field signals FS and the rear sound field signals RS may be either wired signals or wireless signals. The wireless signals may follow communication protocols such as, but not limited to, wireless fidelity (Wi-Fi), ZigBee, Bluetooth, or proprietary radio frequency (RF).

Figure 5:
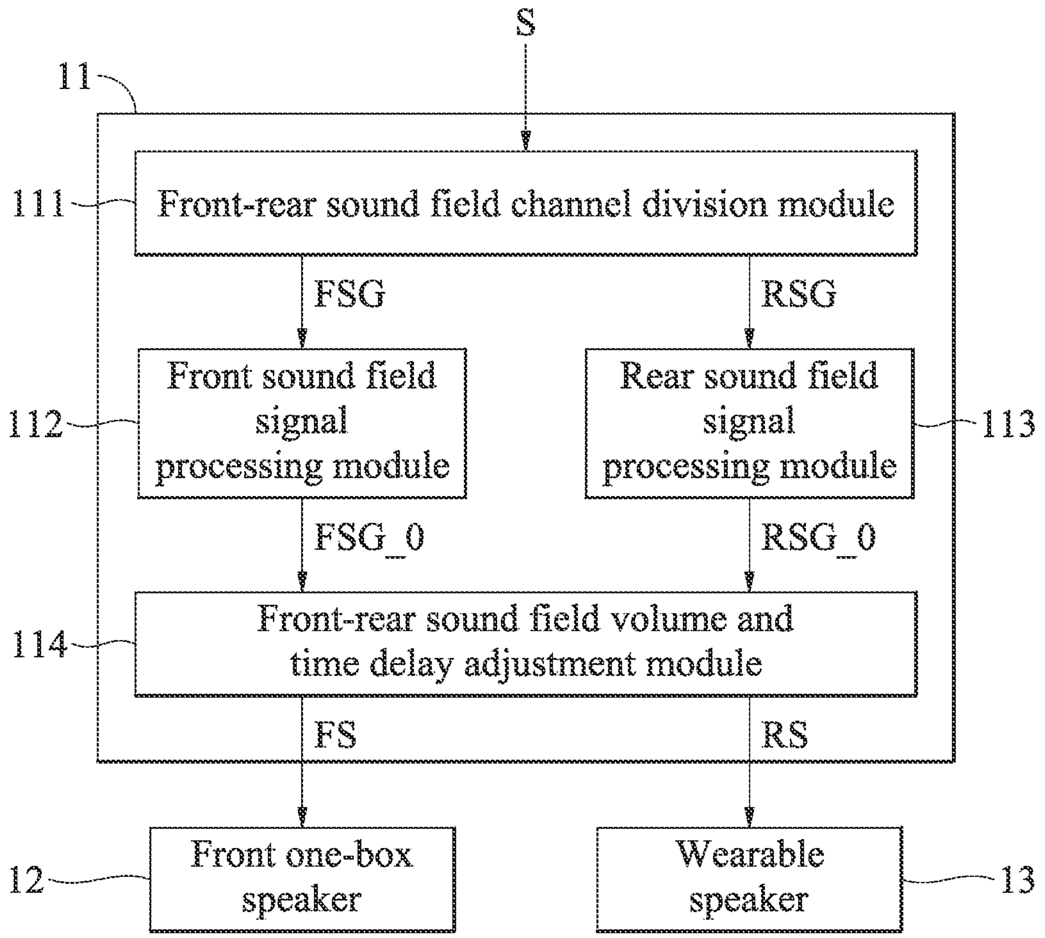
FIG. 5 illustrates a schematic block diagram of a signal processor according to some exemplary embodiments of the instant disclosure.

The front one-box speaker 12 and the wearable speaker 13 emit sound waves simultaneously to deliver an immersive sound filed experience. The wearable speaker 13 is added to the multi-channel audio playback system 1 so that the rear sound field generated by the wearable speaker 13 and the front sound field generated by the front one-box speaker 12 can construct an immersive surround sound field together. Because the sound source of the wearable speaker 13 is closer to the ears of the listener, based on the principle that the intensity of a sound is inversely proportional to squared distance between the sound source and the listener, for signals with identical amplitudes, the perceived intensity of sound waves from the wearable speaker 13 will be greater than the intensity of sound waves from the front one-box speaker 12 for the listener. Consequently, the volume of the rear sound field signals RS needs to be adjusted through an attenuation function, so that a perceived intensity difference between the volume of the front one-box speaker 12 and the volume of the wearable speaker 13 resulted from a listening distance is compensated. A transmission time delay difference exists between a front sound field sound wave emitted by the front one-box speaker 12 and a rear sound field sound wave emitted by the wearable speaker 13, and the compensation for the transmission time delay is performed in the time-domain based on an overall delay time difference between the generation of electrical signals, the transmission of electrical signals to the front one-box speaker 12 and the wearable speaker 13, and the sound waves emitted from the two speakers to reach the ears of the listener respectively. This compensation is to make sure the two sound waves emitted by the front speaker 12 and the wearable speaker 13 reach the listener's ears at approximately the same time. Therefore, the listener won't have the feeling of sound field incoordination. Please refer to FIG. 5. In some exemplary embodiments, the signal processor 11 comprises a front-rear sound field channel division module 111, a front sound field signal processing module 112, a rear sound field signal processing module 113, and a front-rear sound field volume and time delay adjustment module 114. The front-rear sound field channel division module 111 is configured to divide the multi-channel signal S into a front sound field signal group FSG and a rear sound field signal group RSG. The front sound field signal processing module 112 processes the front sound field signal group FSG to generate a processed front sound field signal group FSG_0, and the processed front sound field signal group FSG_0 is inputted to the front-rear sound field volume and time delay adjustment module 114. The front-rear sound field volume and time delay adjustment module 114 generates a plurality of front sound field signals FS to the front one-box speaker 12. The rear sound field signal processing module 113 processes the rear sound field signal group RSG to generate a processed rear sound field signal group RSG_0, and the processed rear sound field signal group RSG_0 is inputted to the front-rear sound field volume and time delay adjustment module 114. The front-rear sound field volume and time delay adjustment module 114 generates the rear sound field signals RS to the wearable speaker 13.

Figure 6A:
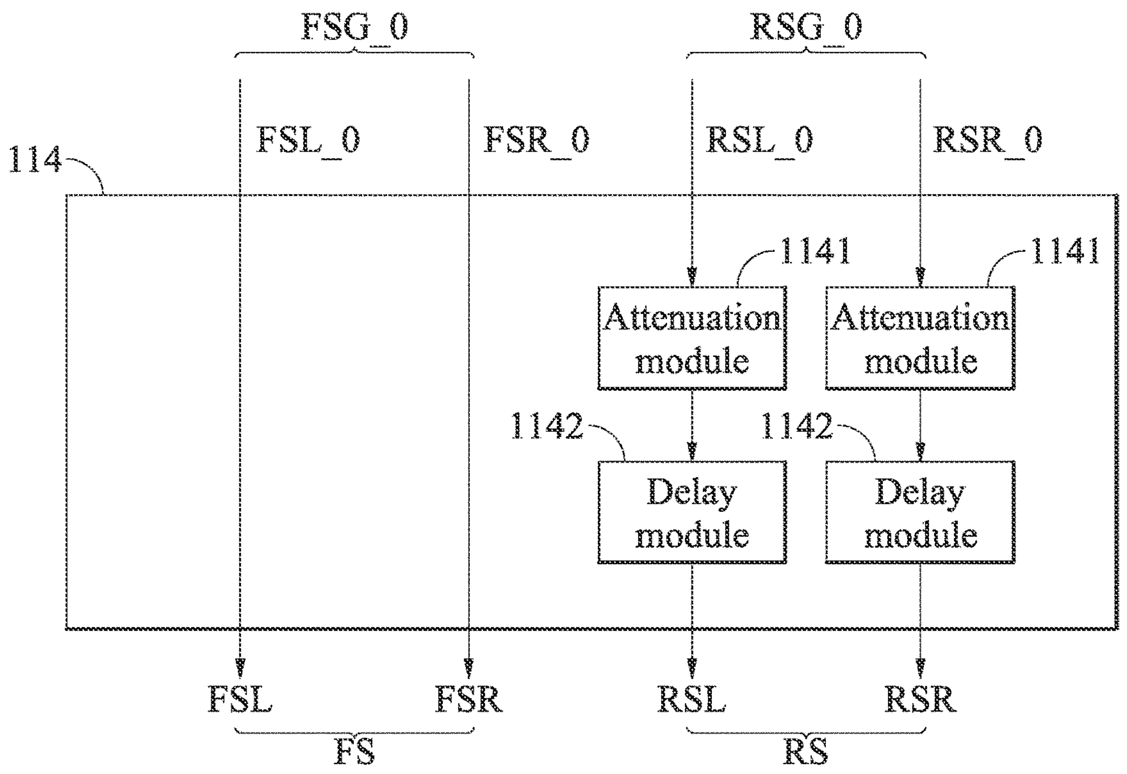
FIG. 6A illustrates a schematic diagram of a front-rear sound field volume and time delay adjustment module according to some exemplary embodiments of the instant disclosure, where a default overall delay time difference is greater than zero.

Please refer to FIG. 6A. FIG. 6A illustrates a schematic diagram of the front-rear sound field volume and time delay adjustment module 114 according to some exemplary embodiments of the instant disclosure, where a default overall delay time difference is a positive value. The front-rear sound field volume and time delay adjustment module 114 receives the processed front sound field signal group FSG_0 (comprising a processed front left sound field signal FSL_0 and a processed front right sound field signal FSR_0) and the processed rear sound field signal group RSG_0 (comprising a processed rear left sound field signal RSL_0 and a processed rear right sound field signal RSR_0). In some exemplary embodiments, the signal processor 11 directly outputs the processed front sound field signal group FSG_0 (FSL_0 and FSR_0) to the front one-box speaker 12 as the front sound field signals FS (a front left sound field signal FSL and a front right sound field signal FSR) and respectively processes the processed rear sound field signal group RSG_0 (RSL_0 and RSR_0) according to Equation 1 through Equation 4 below so as to generate a rear left sound field signal RSL and a rear right sound field signal RSR.

$$SL'=A(RSL\_0); \quad \text{(Equation 1)}$$

$$SR'=A(RSR\_0); \quad \text{(Equation 2)}$$

$$RSL=SL'(n-TD); \quad \text{(Equation 3)}$$

$$RSR=SR'(n-TD), \quad \text{(Equation 4)}$$

where A( ) denotes an attenuation function and may be a linear function with one variable and a coefficient being in a range between 0 and 1: A(x)=kx, where k is a constant; alternatively, in some embodiments, A( ) may also be an attenuation function with ambient reflection coefficient and listening distance as input variables; n denotes discrete sampling instant of digital signal; and TD denotes default overall delay time difference. The attenuation function A( ) is configured to simulate the amount of intensity attenuation with the listening distance LD (achieved using an attenuation module 1141). In some exemplary embodiments, the listening distance has a default value assigned when the signal processor 11 is manufactured. In some other exemplary embodiments, the listening distance LD is a user-adjustable variable. In some other exemplary embodiments, the attenuation function A( ) may be implemented using a digital filter with a filter gain less than 1, so that not only the signal intensity attenuation can be achieved, but also the timbre can be modified through different digital filter response.

The default overall delay time difference includes two parts: the first part is a system-wise electrical signal transmission time difference (STD) between two different signal transmission paths, which are the paths from the signal processor 11 to the front one-box speaker 12 and from the signal processor 11 to the wearable speaker 13; the second part is an air propagation time difference between the time for the sound emitted by the front one-box speaker 12 to reach the ears of the listener and the time for the sound emitted by the wearable speaker 13 to reach the ears of the listener. The default overall delay time difference is obtained by summing up the air propagation time difference and the system-wise electrical signal transmission time difference. The signal processor 11 performs time-domain inverse compensation on the front sound field signals FS and the rear sound field signals RS according to the default overall delay time difference (achieved using a delay module 1142), so that the time difference between the time at which the sound emitted by the wearable speaker 13 reaches the listener and the time at which the sound emitted by the front one-box speaker 12 reaches the listener is less than a default tolerable value. Therefore, when the front one-box speaker 12 and the wearable speaker 13 emit sounds at the same time, the listener will not have the feeling of sound field incoordination. The tolerable value may be adjusted by the user within a limited range. Through experimentation, it is found that, when the tolerable value is within a range less than 80 milliseconds (ms), the front sound field established by the front one-box speaker 12 and the rear sound field established by the wearable speaker 13 can be combined into a whole, and thus an immersive sound field can be achieved. When the overall delay time difference is less than 5 ms, focusing of the sound image within the sound field is optimal. When the overall delay time difference gradually increases within the range between 5 ms and 80 ms, spatial reverberation effect of the sound field increases, and the focusing of the sound image is slightly fuzzier but is still perceived as one. When the overall delay time difference increases over 80 ms, the onset time difference between the two sound fields will become more noticeable, where separation of the sound fields can further happen. As a result, the tolerable value of the recommended overall delay time difference is 80 ms, but the instant disclosure is not limited thereto.

The air propagation time difference can be calculated using Equation 5. The signal transmission time difference is dependent on system configuration and is obtained through measurement. In some exemplary embodiments, when the signal processor 11 is connected to the front one-box speaker 12 and the wearable speaker 13 through respective wireless signals, and the two wireless signals are transmitted under the same transmission mechanism, the signal transmission time difference between the two wireless signals can almost be ignored, and merely the air propagation time difference is to be taken into consideration. In this case, the default overall delay time difference TD can be obtained using Equation 5 below:

$$TD=INT(fs*LD/v). \quad \text{(Equation 5)}$$

In Equation 5, INTO denotes a units integer floor and ceiling function such as an unconditional carry function, an unconditional round function, or a round function; fs denotes the sampling rate of the multi-channel signal S by the signal processor 11; LD denotes the listening distance; and v denotes the default value of speed of sound, which equals 346 m/s under the condition of room temperature (25° C.). The default value of speed of sound v is a function with ambient temperature T (in Celsius) as an input parameter: v=331+0.6T.

However, when the signal processor 11 is integrated in the front one-box speaker 12 or directly wired to the front speaker 12, and the signal processor 11 is wirelessly connected to the wearable speaker 13, the signal transmission time difference has to be taken into consideration. As a result, in some other exemplary embodiments, in the case that both the air propagation time difference and electrical signal transmission time difference are taken into consideration, the default overall delay time difference TD can be calculated using Equation 6 below:

$$TD=INT(fs*LD/v)+STD. \quad \text{(Equation 6)}$$

In Equation 6, STD denotes the system-wise electrical signal transmission time difference (system-wise delay time). A first electrical signal transmission time denotes the time it takes to transmit a signal from the signal processor 11 to the front one-box speaker 12, and a second electrical signal transmission time denotes the time it takes to transmit a signal from the signal processor 11 to the wearable speaker 13, the system-wise electrical signal transmission time difference STD is the difference between the first electrical signal transmission time and the second electrical signal transmission time. The system-wise delay time is obtained through measurement and is not relevant to the listening distance LD, and thus the system-wise delay time is a default fixed value.

Figure 6B:
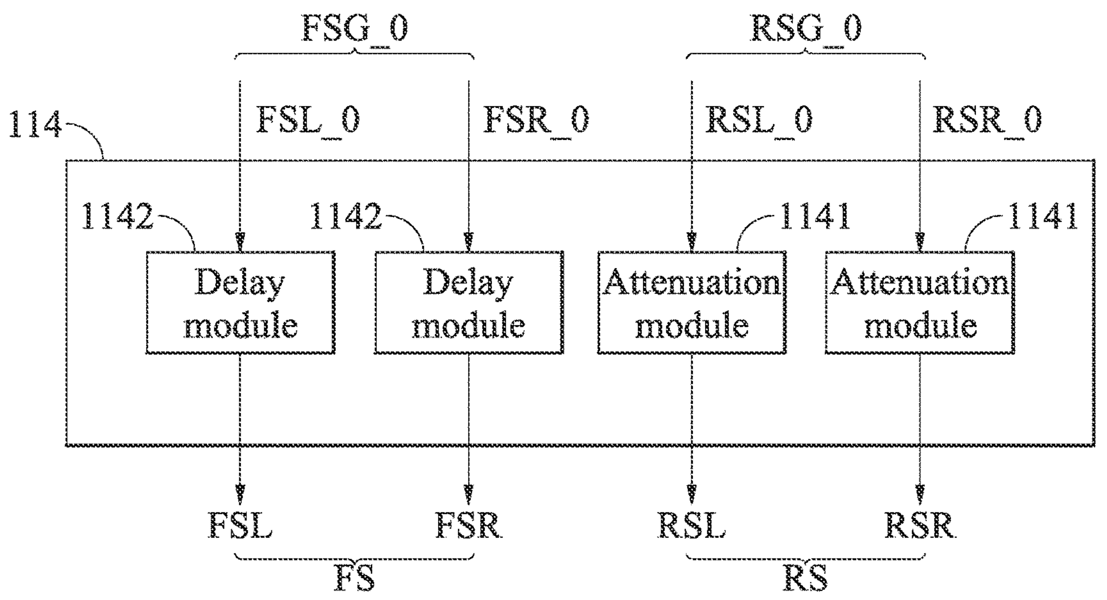
FIG. 6B illustrates a schematic diagram of the front-rear sound field volume and time delay adjustment module according to some exemplary embodiments of the instant disclosure, where the default overall delay time difference is less than zero.

Please refer to FIG. 6B. In some exemplary embodiments, the signal processor 11 is wire-connected to the front one-box speaker 12 and wirelessly connected to the wearable speaker 13. In these embodiments, since the delay time of wireless transmission is usually far longer than that of wired transmission, and the time difference between wireless transmission and wired transmission is greater than the air propagation delay, the front sound field signals FS should be added with a time delay. Therefore, the front sound field signals FS with the time delay and the rear sound field signals RS through wireless transmission can reach the ears of the listener at the same time. With this configuration, when the first electrical signal transmission time is less than the second electrical signal transmission time and thus the difference between the first electrical signal transmission time and the second electrical signal transmission time is negative, the calculated value of TD using Equation 6 (TD=INT(fs*LD/v)+STD) may lead to a negative value. Negative TD implies that the second electrical signal transmission time between the signal processor 11 and the wearable speaker 13 is greater than the first electrical signal transmission time between the signal processor 11 and the front one-box speaker 12, and that the difference between the first electrical signal transmission time and the second electrical signal transmission time is greater than the air propagation delay time difference between the front one-box speaker 12 and the wearable speaker 13. Under this condition, the time delay compensation should be performed on the front left sound field signal FSL and the front right sound field signal FSR of the front one-box speaker 12, while merely the attenuation process is performed on the rear left sound field signal RSL and the rear right sound field signal RSR. This processes can be described as Equation 7 through Equation 10 below:

$$FSL=FSL\_0(n-TD); \quad \text{(Equation 7)}$$

$$FSR=FSR\_0(n-TD); \quad \text{(Equation 8)}$$

$$RSL=A(RSL\_0(n)); \quad \text{(Equation 9)}$$

$$RSR=A(RSR\_0(n)). \quad \text{(Equation 10)}$$

The foregoing exemplary embodiments shown in FIG. 6A and FIG. 6B both include performing a default overall delay compensation on the front sound field signals FS or the rear sound field signals RS. Therefore, when the front one-box speaker 12 plays the front sound field signals FS, the sound wave reaches the listener's ears after the air propagation time, and the sound wave (the rear sound field signals RS) emitted by the wearable speaker 13 reaches the listener's ears at the same time. However, some exemplary embodiments allow the user to adjust the value of the default overall delay compensation within a range of less than 80 ms, so that the sound waves emitted by the wearable speaker 13 will reach the listener's ears slightly later than the sound waves emitted by the front speaker 12 and thus an effect similar to the spatial reverberation effect can be provided.

In some exemplary embodiments, the front-rear sound field channel division module 111, the front sound field signal processing module 112, and the rear sound field signal processing module 113 of the signal processor 11 may be integrated in a processing chip, for example, the internal processing chip of a mobile phone, and then the signals are transmitted to the front one-box speaker 12 and the wearable speaker 13. However, in some other exemplary embodiments, the front sound field signal processing module 112 may be implemented in the processing chip of the front one-box speaker 12, the rear sound field signal processing module 113 may be implemented in the processing chip of the wearable speaker 13, and the front-rear sound field channel division module 111 divides the multi-channel signal S into the front sound field signal group FSG and the rear sound field signal group RSG and then outputs the front sound field signal group FSG and the rear sound field signal group RSG to the front one-box speaker 12 and the wearable speaker 13 for further processing, respectively.

FIG. 7, FIG. 9A, FIG. 9B, FIG. 10A, FIG. 10B, FIG. 11A, FIG. 11B, and FIG. 12 illustrate schematic diagrams of front sound field processing modules according to some exemplary embodiments of the instant disclosure. Please refer to FIG. 7. In this exemplary embodiment, the front sound field signal processing module 112 comprises a first mixing module 1121, a crosstalk cancellation module 1122, and a second mixing module 1123. The front sound field signal group FSG comprises a front left channel signal FL, a front right channel signal FR, a center channel signal C, a low frequency effect channel signal LFE, a front height left channel signal FHL, and a front height right channel signal FHR. When the left and right drivers play their respectively assigned audios, if the left (right) ear hears the sound emitted towards the right (left) ear, crosstalk interference occurs, and thus the sound field performance is degraded. In view of this, the first mixing module 1121 mixes the paired audio signals, where the front left channel signal FL and the front height left channel signal FHL are mixed into a front mixed left signal FML, and the front right channel signal FR and the front height right channel signal FHR are mixed into a front mixed right signal FMR. Please refer to Equation 11 and Equation 12 below for this mixing process:

$$FML=FL+a1*FHL; \quad \text{(Equation 11)}$$

$$FMR=FR+a1*FHR, \quad \text{(Equation 12)}$$

where a1 is a weight between 0 and 1 and represents a mixing ratio of the front height left channel signal FHL (the front height right channel signal FHR) to the front left channel signal FL (the front right channel signal FR) of the multi-channel audio playback system 1.

Figure 8:
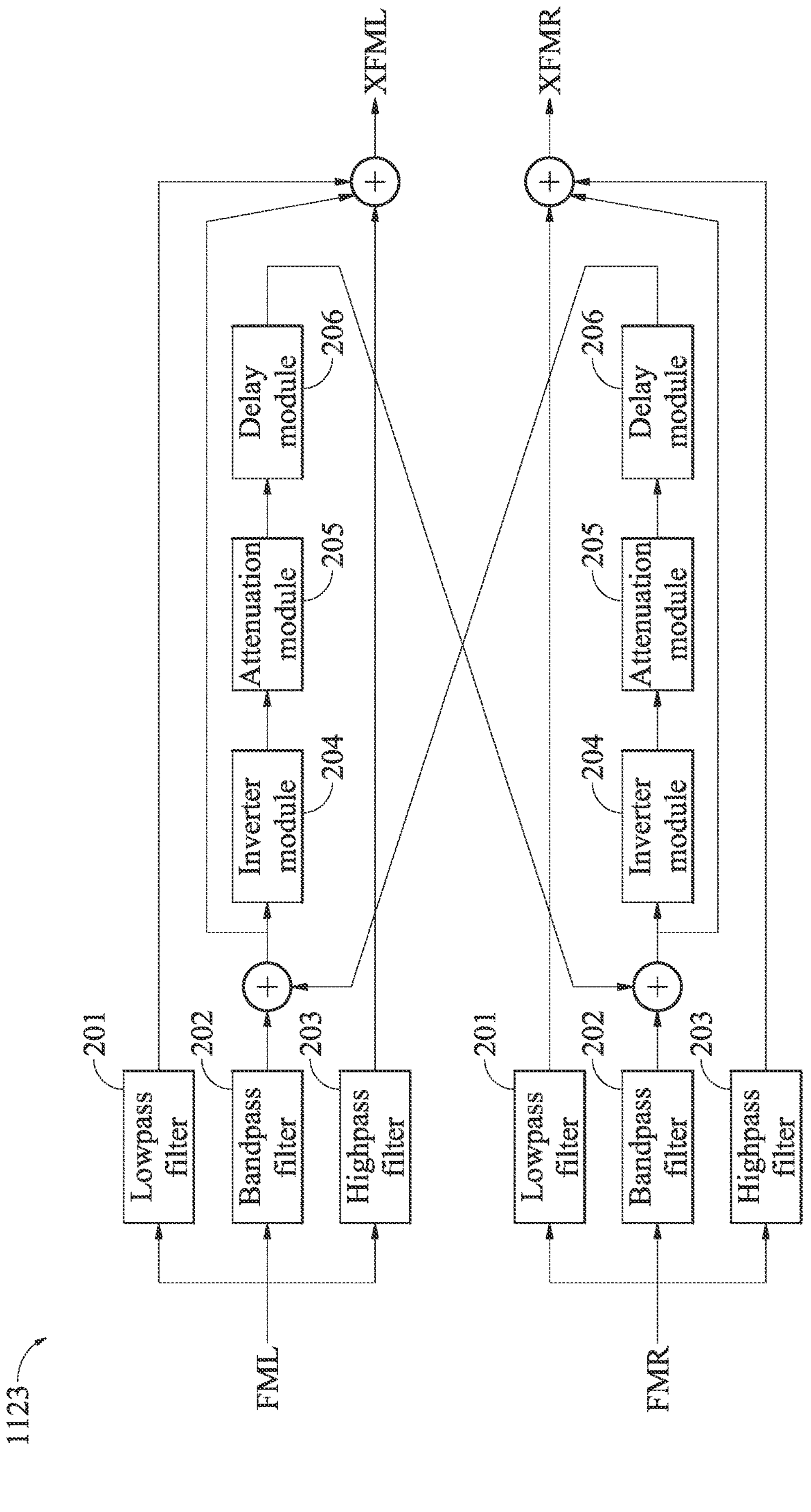
FIG. 8 illustrates a schematic diagram of a recursive surround sound crosstalk cancellation module according to some exemplary embodiments of the instant disclosure.

In order to suppress the crosstalk between the left channel and the right channel, the front mixed left signal FML and the front mixed right signal FMR are inputted to the crosstalk cancellation module 1122, so that a crosstalk-cancelled front mixed left signal XFML and a crosstalk-cancelled front mixed right signal XFMR are generated. The crosstalk cancellation algorithm can be implemented using a variety of methods. The following exemplary embodiment adopts a simpler recursive ambiophonic crosstalk eliminator (RACE) algorithm for illustration. Please refer to FIG. 8, Equation 13, and Equation 14 below. FIG. 8 illustrates a schematic diagram of a recursive surround sound crosstalk cancellation module according to some exemplary embodiments of the instant disclosure.

$$XFML=FML(n)-AL'*FMR(n-DT'); \quad \text{(Equation 13)}$$

$$XFMR=FMR(n)-AR'*FML(n-DT'). \quad \text{(Equation 14)}$$

In Equation 13 and Equation 14, FML and FMR denote digitally sampled signals of the front mixed left signal FML and the front mixed right signal FMR, respectively; AL' and AR' denote attenuation factors in a range between −2 dB and −4 dB; n denotes the sampling instant of the front mixed left signal FML and the front mixed right signal FMR; DT' denotes a default crosstalk delay time, which represents the air propagation time difference for a sound wave emitted by one of the left speaker and the right speaker to reach the two ears of the listener (roughly 60-120 μs). Take the front mixed left signal FML as example, the front mixed left signal FML, after being inputted into the RACE crosstalk cancellation module, is filtered by a bandpass filter 202, phase inverted by an inverter module 204, attenuated by an attenuation module 205, and delayed by a delay module 206. During this process, the high-frequency band and the low-frequency band (outputs of a highpass filter 203 and a lowpass filter 201, respectively) are bypassed, and only the mid-frequency band needs crosstalk cancellation. The recommended high-frequency band is higher than 5000 Hz, and the recommended low-frequency band is lower than 250 Hz. Sound waves lower than 250 Hz contributes to a very small phase difference between the two ears, and this phase difference is not helpful for spatiality determination. In the embodiment shown in FIG. 8, the attenuation factors AL', AR' and the crosstalk delay time DT' are related to an angle between two lines respectively formed by connecting the two ears to the speaker on one side, and are also related to the distance between the two ears (inter-aural distance, IAD): the greater the angle are, the smaller the attenuation factors is (the longer IAD is), the longer the crosstalk delay time is; after being processed by the RACE algorithm, an anti-crosstalk signal of the other channel that causes interference is already added to the mid frequency band of the processed channel before the audio signals are outputted to the speakers, and thus the crosstalk interference has been suppressed.

Figure 7:
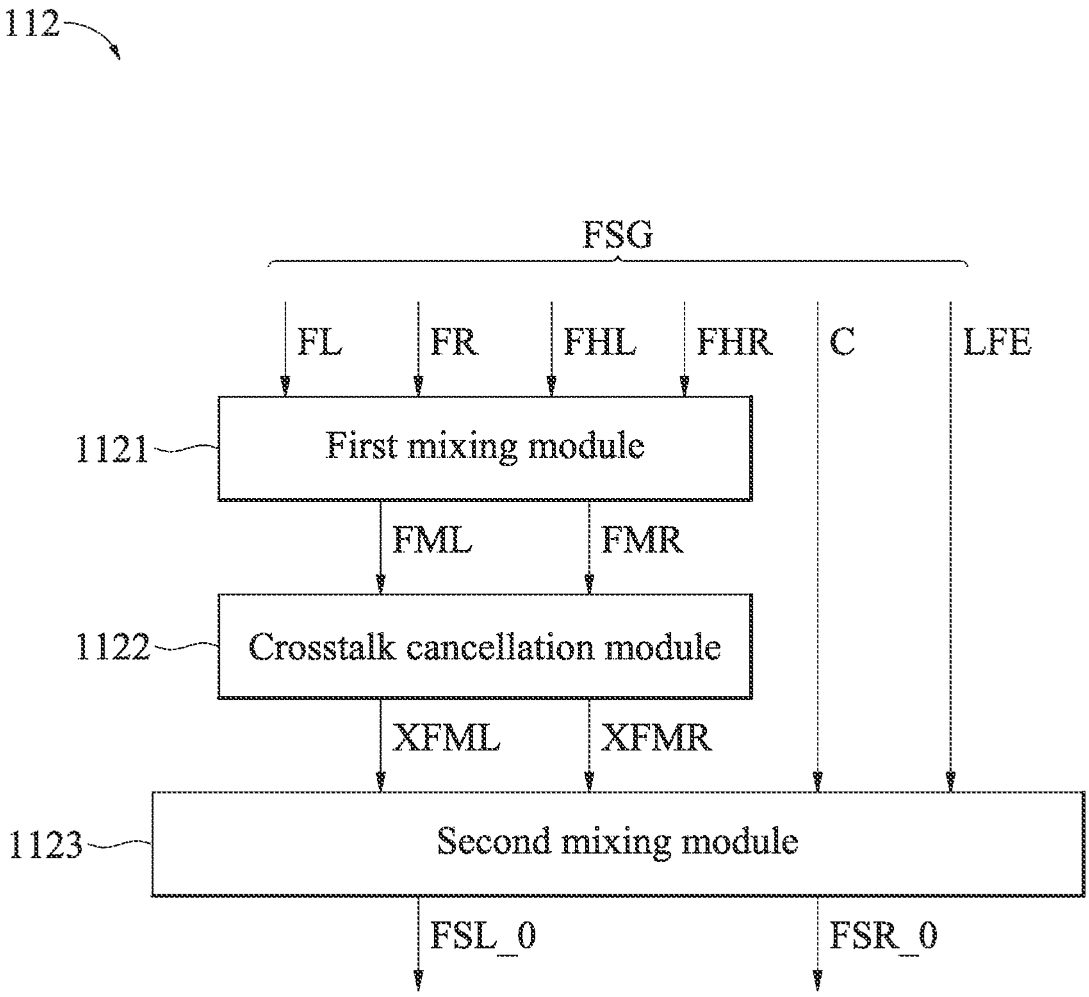
FIG. 7, FIG. 9A, FIG. 9B, FIG. 10A, FIG. 10B, FIG. 11A, FIG. 11B, and FIG. 12 illustrate schematic diagrams of front sound field processing modules according to some exemplary embodiments of the instant disclosure.

Please refer to FIG. 7. The crosstalk-cancelled front mixed left signal XFML, the crosstalk-cancelled front mixed right signal XFMR, the center channel signal C, and the low frequency effect channel signal LFE are all inputted to the second mixing module 1123, so that the front sound field signals FS are generated. During this process, the crosstalk-cancelled front mixed left signal XFML, the center channel signal C, and the low frequency effect channel signal LFE are mixed, so that the front left sound field signal FSL is generated; the crosstalk-cancelled front mixed right signal XFMR, the center channel signal C, and the low frequency effect channel signal LFE are mixed, so that the front right sound field signal FSR is generated. Please refer to Equation 15 and Equation 16 below:

$$FSL=XFML+b1*C+b2*LFE; \quad \text{(Equation 15)}$$

$$FSR=XFMR+b1*C+b2*LFE, \quad \text{(Equation 16)}$$

where b1 and b2 are weights between 0 and 1 and may be identical or not identical, and b1 and b2 represent mixing ratios of the center channel signal C and the low frequency effect channel signal LFE to the crosstalk-cancelled front mixed left signal XFML (the crosstalk-cancelled front mixed right signal XFMR) of the multi-channel audio playback system 1, respectively.

The exemplary embodiment shown in FIG. 7 can be applied to the front one-box speaker 12 having two drivers. However, in some other exemplary embodiments, the signal processor 11 may be adapted for the front one-box speaker 12 having more than two drivers. Please refer to FIG. 9A. The difference between the exemplary embodiment shown in FIG. 9A and the exemplary shown in FIG. 7 is at least that in the exemplary embodiment shown in FIG. 9A, the low frequency effect channel signal LFE is not inputted to the second mixing module 1123 for mixing; instead, the low frequency effect channel signal LFE is directly outputted to a subwoofer driver of the front one-box speaker 12 (in this exemplary embodiment, at least three drivers are in the front one-box speaker 12). Please refer to Equation 17 through Equation 19 below:

$$FSL=XFML+b1*C; \quad \text{(Equation 17)}$$

$$FSR=XFMR+b1*C; \quad \text{(Equation 18)}$$

$$LFE'=LFE*b2, \quad \text{(Equation 19)}$$

where b1 and b2 are weights between 0 and 1 and may be identical or not identical, and LFE' denotes the low frequency effect channel signal LFE or the attenuated low frequency effect channel signal LFE.

Figure 9A:
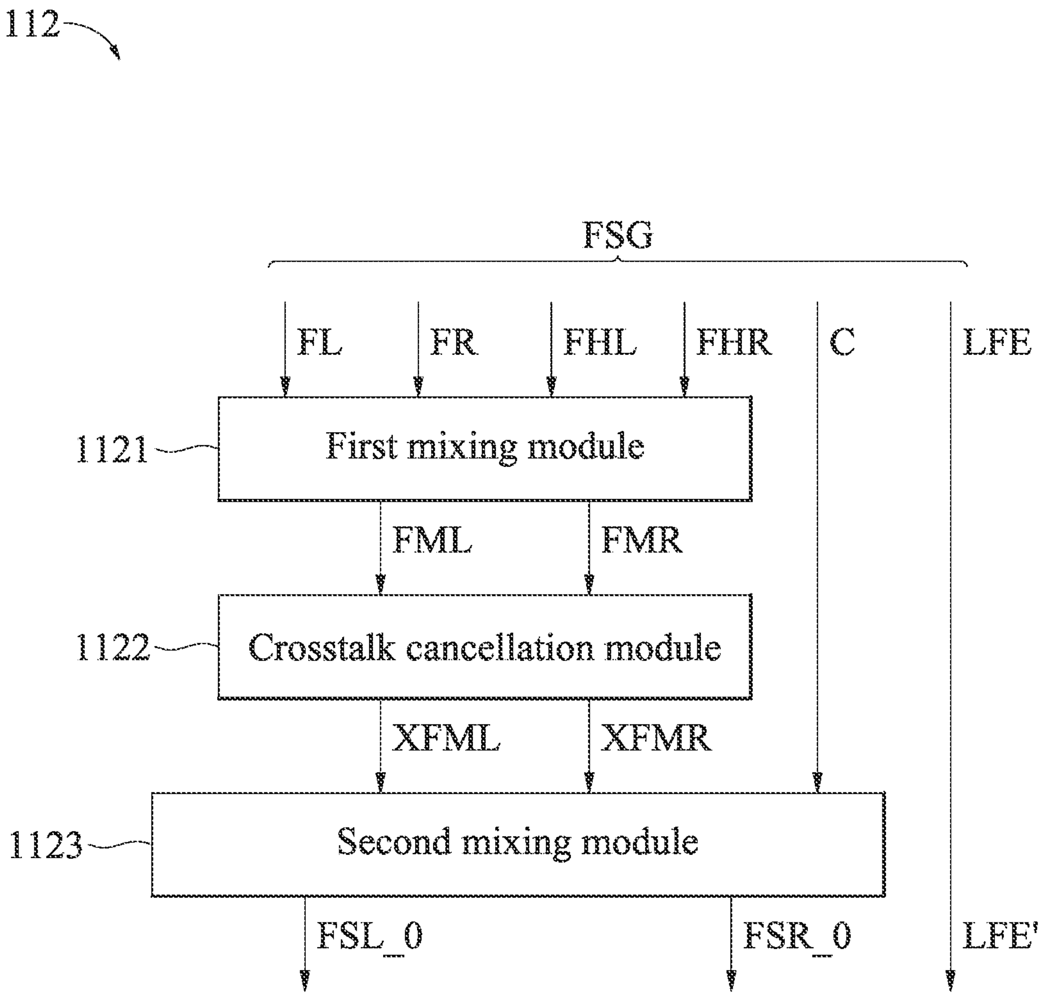
Figure 9B:
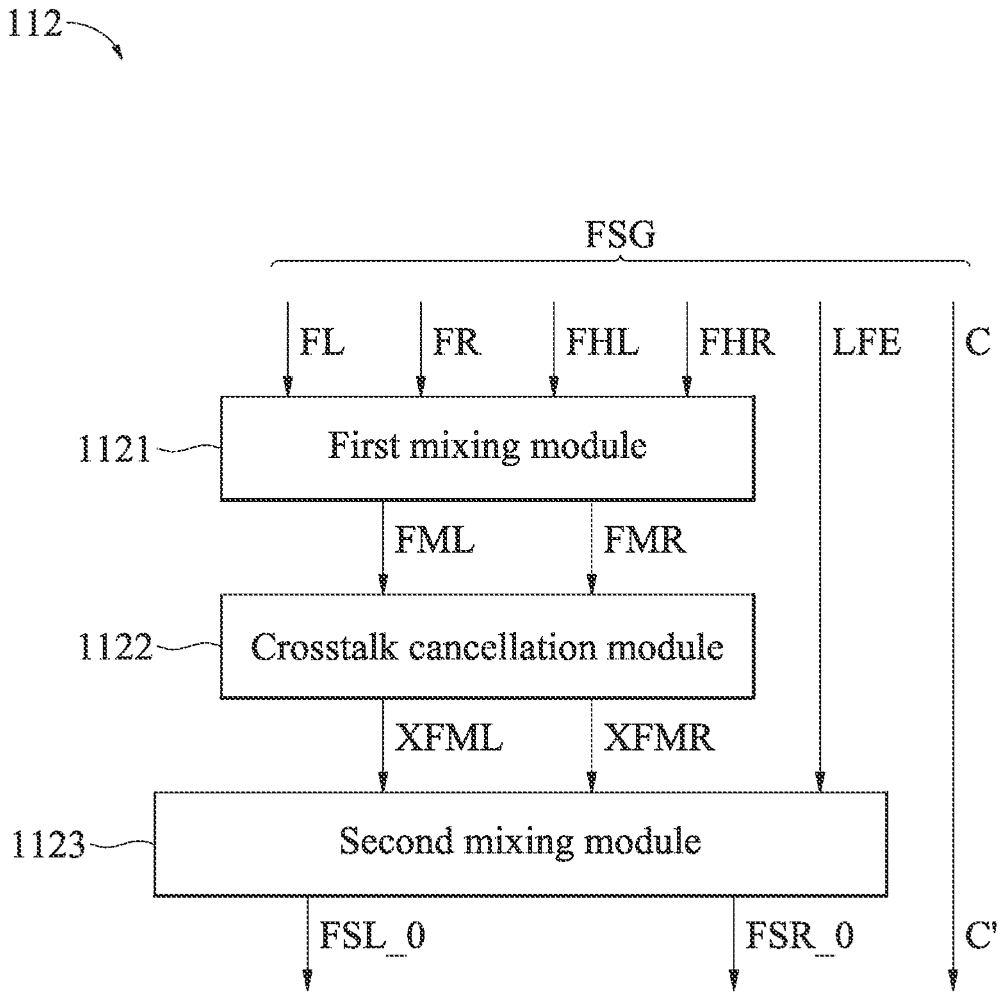

Please refer to FIG. 9B. Similarly, in the embodiment shown in FIG. 9B, the center channel signal C is not inputted to the second mixing module 1123 for mixing; instead, the center channel signal C is directly outputted to a third driver of the front one-box speaker 12 (in this exemplary embodiment, at least three drivers are in the front one-box speaker 12). Please refer to Equation 20 through Equation 22 below:

$$FSL=XFML+b1*LFE; \quad \text{(Equation 20)}$$

$$FSR=XFMR+b1*LFE; \quad \text{(Equation 21)}$$

$$C'=C*b2, \quad \text{(Equation 22)}$$

where b1 and b2 are weights between 0 and 1 and may be identical or not identical, and C' denotes the center channel signal C or the attenuated center channel signal C.

The exemplary embodiments shown in FIG. 9A and FIG. 9B can be applied to the front one-box speaker 12 having three drivers. During the mixing process of the digital audio signals, each of the signals is multiplied by a respective mixing ratio, so that the summation of the signals does not exceed a saturation upper limit. Consequently, when more signals are mixed, their respective ratios in the mixed signal will become lower. In general, the center channel signal C of the center speaker 93 is usually used for playing human voices, and thus letting the center channel signal C remain independent and not mixed can increase the clarity of played human voices. Besides, the low frequency effect channel signal LFE usually carries higher audio energy, and thus when the low frequency effect channel signal LFE is mixed, other signals may need more attenuation to avoid saturation. As a result, in some exemplary embodiments, two of the three drivers of the front one-box speaker 12 may be used to play the front sound field signals FS, and the other driver can be used to play the center channel signal C so as to increase the clarity of played human voices or used to play the low frequency effect channel signal LFE so as to increase the punch of the low frequency band.

Figure 10A:
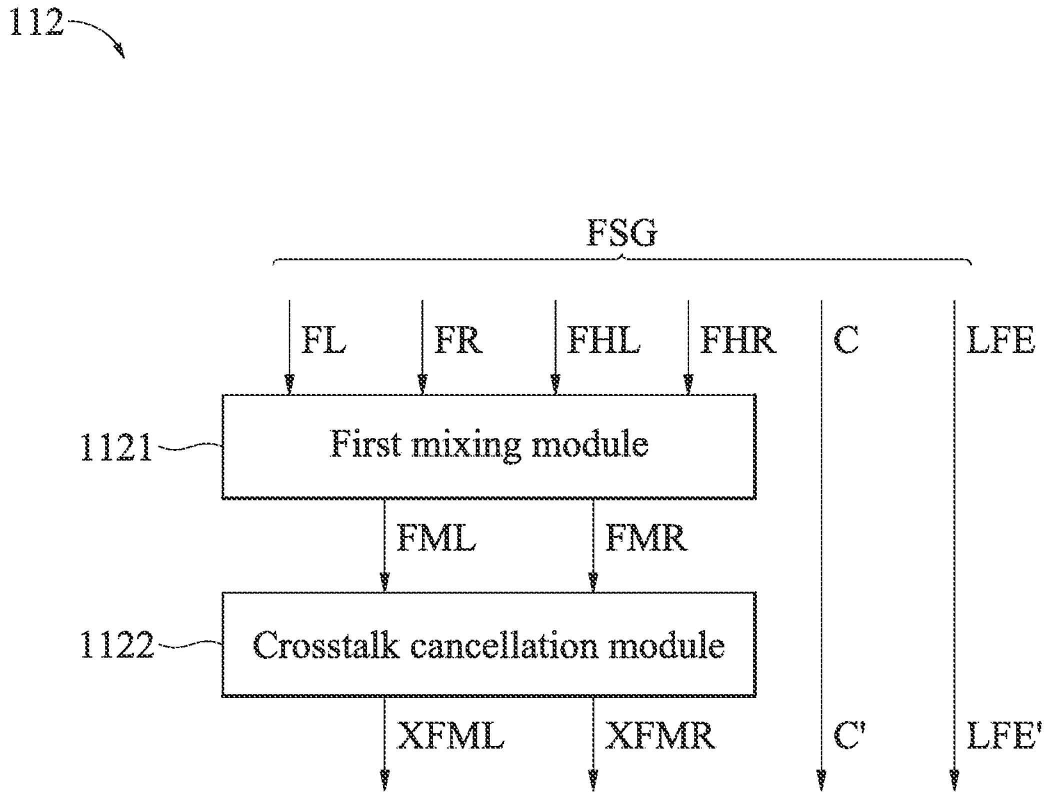

Please refer to FIG. 10A. In some other exemplary embodiments, the front one-box speaker 12 comprises four drivers. In these exemplary embodiments, the center channel signal C and the low frequency effect channel signal LFE are both not inputted to the second mixing module 1123 for mixing; instead, the center channel signal C and the low frequency effect channel signal LFE are directly outputted to the third driver and a fourth driver of the front one-box speaker 12, respectively. The third driver can be used to play the center channel signal C so as to increase the clarity of played human voices, and the fourth driver can be used to play the low frequency effect channel signal LFE so as to increase the punch of the low frequency band. As a result, the drivers of the front one-box speaker 12 respectively play the left and right front sound field signals FS, the center channel signal C, and the low frequency effect channel signal LFE. Please refer to Equation 23 through Equation 26 below:

$$FSL=XFML; \quad \text{(Equation 23)}$$

$$FSR=XFMR; \quad \text{(Equation 24)}$$

$$LFE'=LFE*b1; \quad \text{(Equation 25)}$$

$$C'=C*b2. \quad \text{(Equation 26)}$$

In some other exemplary embodiments, the multi-channel audio playback system 1 includes an independent subwoofer speaker and the front one-box speaker 12 comprises three drivers. As shown in FIG. 10A, the center channel signal C and the low frequency effect channel signal LFE are both not inputted to the second mixing module 1123 for mixing; instead, the center channel signal C is outputted to the third driver so as to increase the clarity of the played human voices, and the low frequency effect channel signal LFE is outputted to the independent subwoofer speaker so as to increase the punch of the low frequency band. As a result, the drivers of the front one-box speaker 12 respectively play the left and right front sound field signals FS and the center channel signal C, and the independent subwoofer speaker plays the low frequency effect channel signal LFE. Please refer to Equation 23 through Equation 26 above.

Figure 10B:
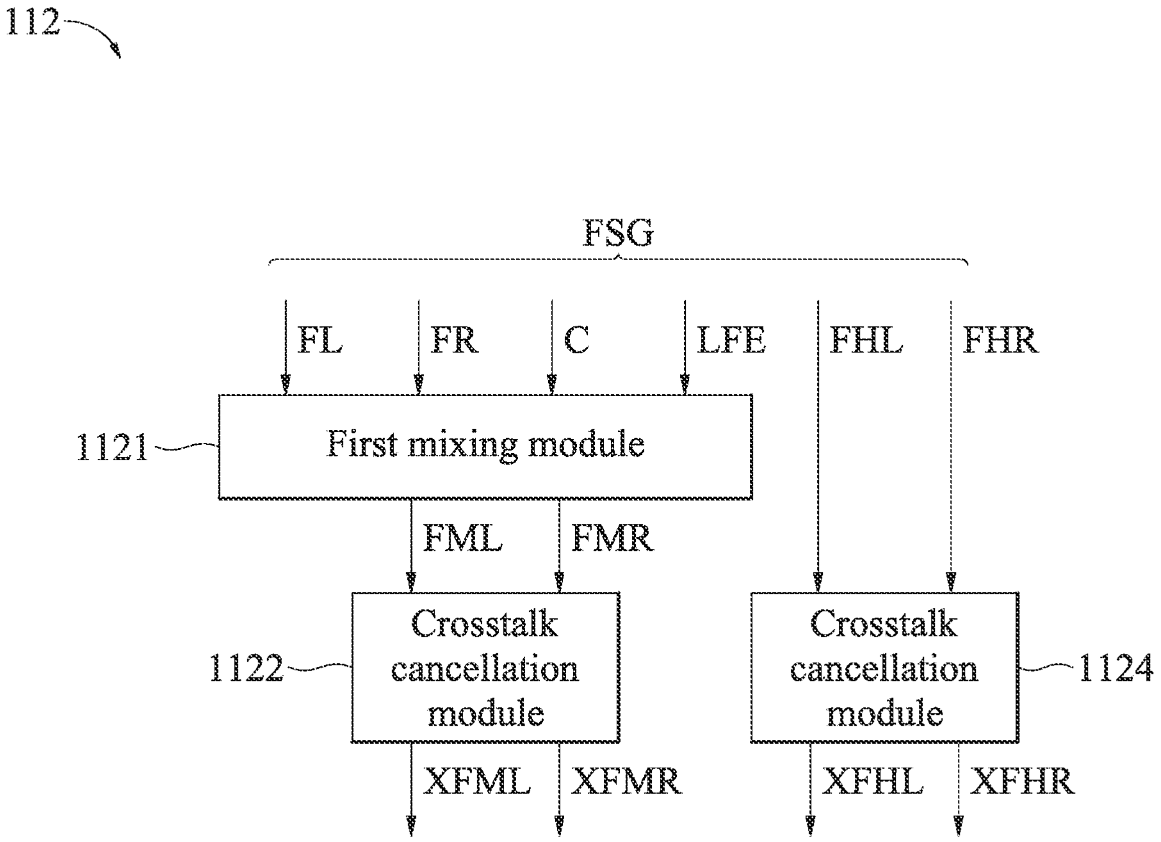

In some other exemplary embodiments, the front one-box speaker 12 comprises four drivers, wherein two of the drivers are front-firing drivers, and the other two drivers are upward-firing drivers. The two upward-firing drivers are used to increase the height of the sound field. As shown in FIG. 10B, the front left channel signal FL, the front right channel signal FR, the center channel signal C, and the low frequency effect channel signal LFE are mixed by the first mixing module 1121 and then processed by the crosstalk cancellation module 1122, so that the crosstalk-cancelled front mixed left signal XFML and the crosstalk-cancelled front mixed right signal XFMR are generated; the front height left channel signal FHL and the front height right channel signal FHR are processed by the crosstalk cancellation module 1124, so that a crosstalk-cancelled front height left channel signal XFHL and a crosstalk-cancelled front height right channel XFHR are generated. The two front-firing drivers of the front one-box speaker 12 are used to play the crosstalk-cancelled front mixed left signal XFML and the crosstalk-cancelled front mixed right signal XFMR, respectively, and the two upward-firing drivers of the front one-box speaker 12 are used to play the crosstalk-cancelled front height left signal XFHL and the crosstalk-cancelled front height right signal XFHR, respectively.

Figure 11A:
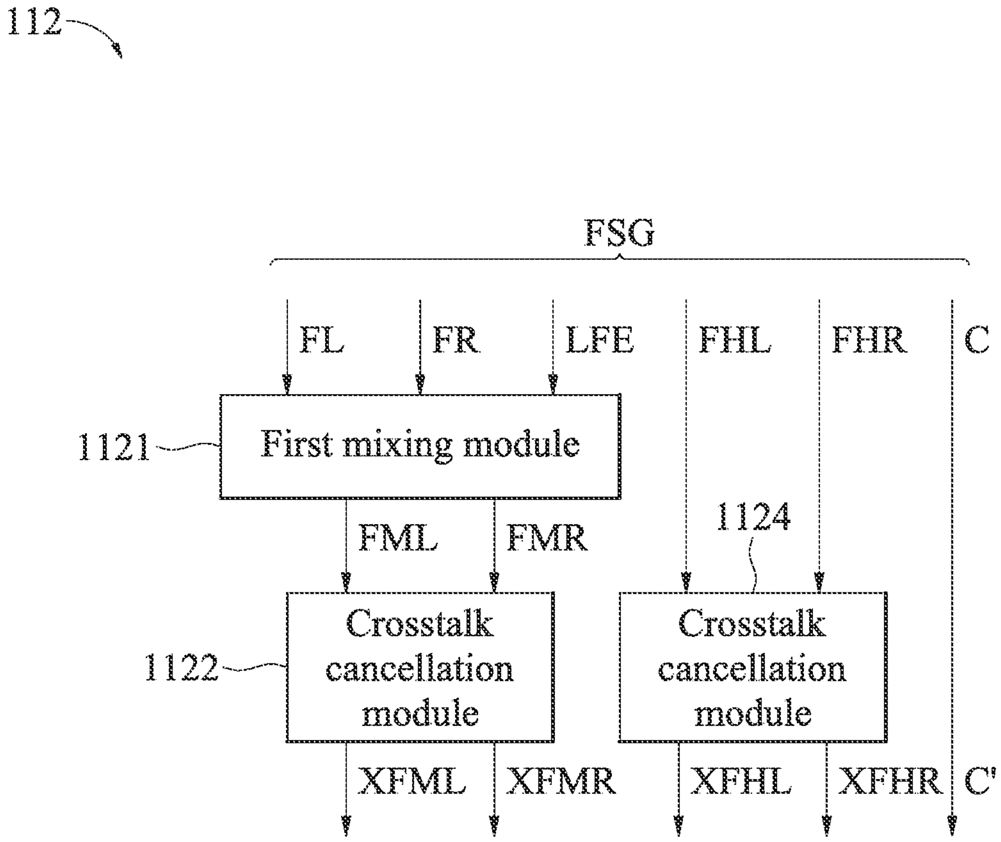

In some other exemplary embodiments, the front one-box speaker 12 comprises five drivers, wherein three of the drivers are front-firing drivers, and the other two drivers are upward-firing drivers. The two upward-firing drivers are used to increase the height of the sound field. As shown in FIG. 11A, the center channel signal C is not mixed by the second mixing module 1123 and is directly outputted to one of the three front-firing drivers of the front one-box speaker 12 so as to increase the clarity of played human voices. The front left channel signal FL, the front right channel signal FR, and the low frequency effect channel signal LFE are mixed by the first mixing module 1121 and then processed by the crosstalk cancellation module 1122, so that the crosstalk-cancelled front mixed left signal XFML and the crosstalk-cancelled front mixed right signal XFMR are generated; the front height left channel signal FHL and the front height right channel signal FHR are processed by the crosstalk cancellation module 1124, so that the crosstalk-cancelled front height left channel signal XFHL and the crosstalk-cancelled front height right channel XFHR are generated. The other two of the three front-firing drivers of the front one-box speaker 12 are used to play the crosstalk-cancelled front mixed left signal XFML and the crosstalk-cancelled front mixed right signal XFMR, respectively, and the two upward-firing drivers of the front one-box speaker 12 are used to play the crosstalk-cancelled front height left signal XFHL and the crosstalk-cancelled front height right signal XFHR, respectively.

Figure 11B:
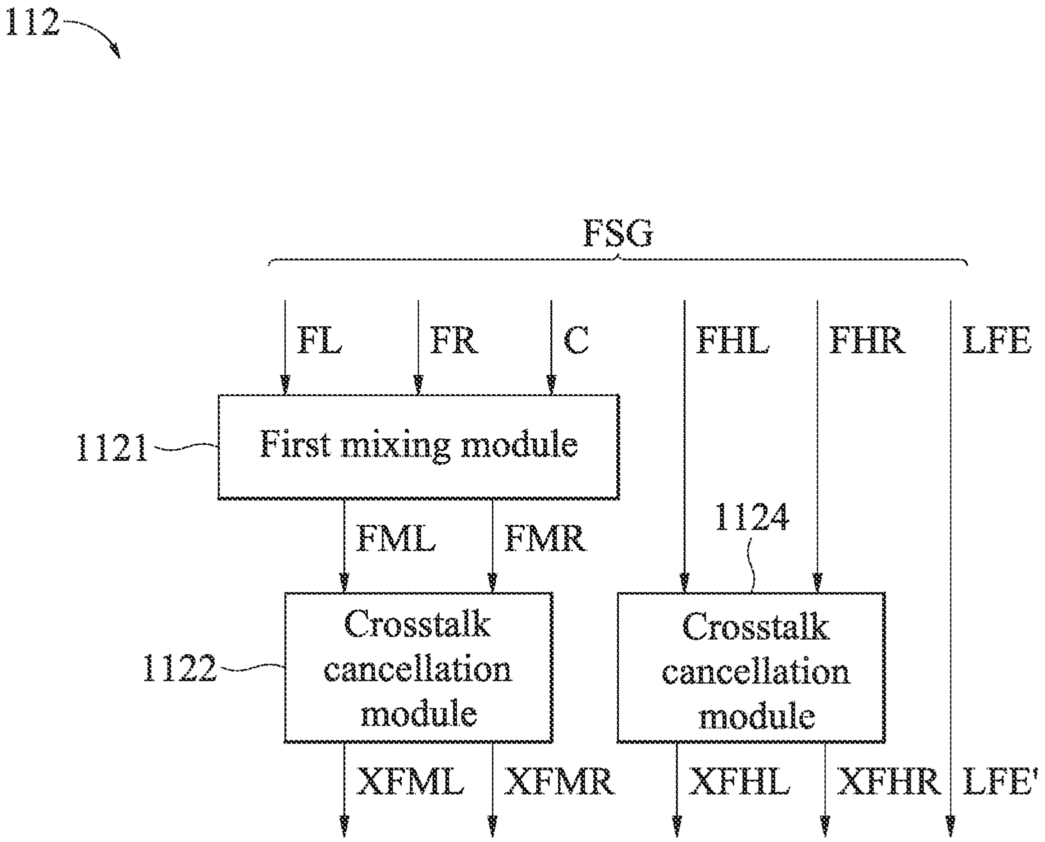

In some other exemplary embodiments, the multi-channel audio playback system 1 includes an independent subwoofer speaker and the front one-box speaker 12 composed of four drivers, wherein two of the drivers are front-firing drivers, and the other two drivers are upward-firing drivers. The two upward-firing drivers are used to increase the height of the sound field. As shown in FIG. 11B, the low frequency effect channel signal LFE is directly outputted to the independent subwoofer speaker so as to increase the punch of the low frequency band. The front left channel signal FL, the front right channel signal FR, and the center channel signal C are mixed by the first mixing module 1121 and then processed by the crosstalk cancellation module 1122, so that the crosstalk-cancelled front mixed left signal XFML and the crosstalk-cancelled front mixed right signal XFMR are generated; the front height left channel signal FHL and the front height right channel signal FHR are processed by the crosstalk cancellation module 1124, so that the crosstalk-cancelled front height left channel signal XFHL and the crosstalk-cancelled front height right channel XFHR are generated. The two front-firing drivers of the front one-box speaker 12 are used to play the crosstalk-cancelled front mixed left signal XFML and the crosstalk-cancelled front mixed right signal XFMR, respectively, and the two upward-firing drivers of the front one-box speaker 12 are used to play the crosstalk-cancelled front height left signal XFHL and the crosstalk-cancelled front height right signal XFHR, respectively.

Figure 12:
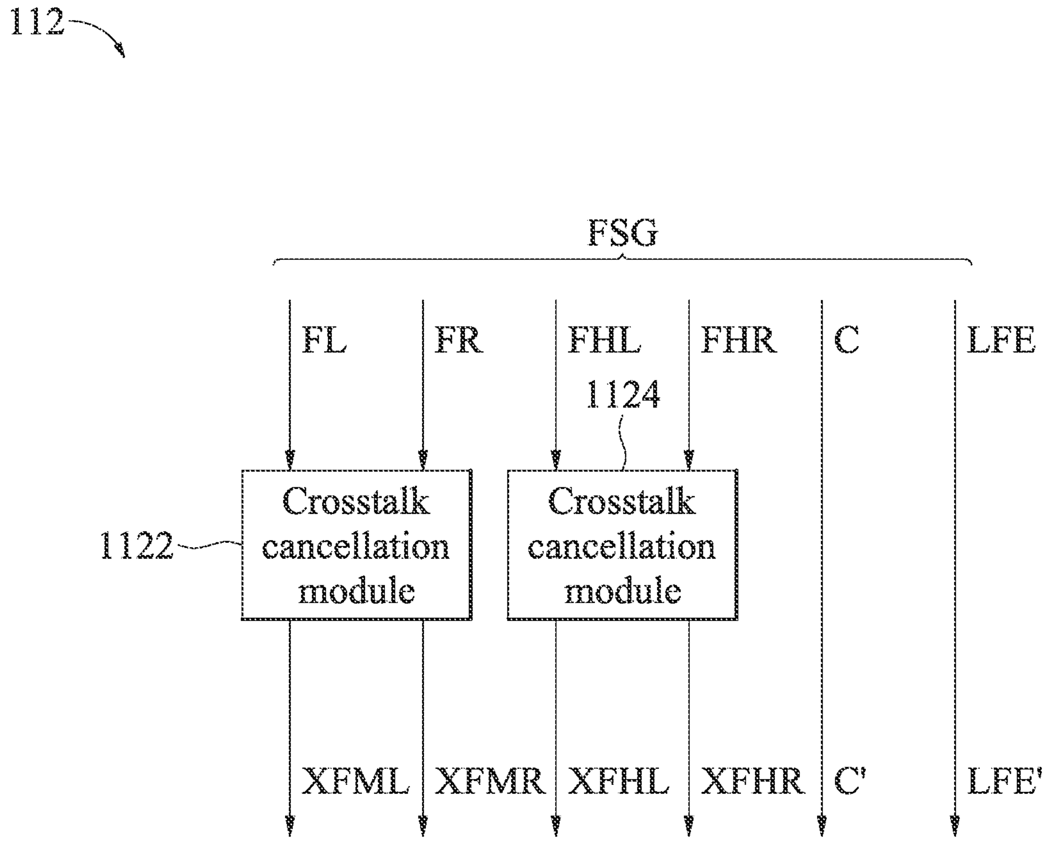

In some other exemplary embodiments, the front one-box speaker 12 comprises six drivers, wherein one of the drivers is a low frequency effect driver, three of the drivers are front-firing drivers, and the other two of the drivers are upward-firing drivers. The two upward-firing drivers are used to increase the height of the sound field. As shown in FIG. 12, the front left channel signal FL and the front right channel signal FR are processed by the crosstalk cancellation module 1122, so that the crosstalk-cancelled front mixed left signal XFML and the crosstalk-cancelled front mixed right signal XFMR are generated; the front height left channel signal FHL and the front height right channel signal FHR are processed by the crosstalk cancellation module 1124, so that the crosstalk-cancelled front height left channel signal XFHL and the crosstalk-cancelled front height right channel XFHR are generated. Two of the three front-firing drivers of the front one-box speaker 12 are used to play the crosstalk-cancelled front mixed left signal XFML and the crosstalk-cancelled front mixed right signal XFMR, respectively, and the two upward-firing drivers of the front one-box speaker 12 are used to play the crosstalk-cancelled front height left signal XFHL and the crosstalk-cancelled front height right signal XFHR, respectively. The center channel signal C is directly outputted to the other front-firing driver of the front one-box speaker 12 so as to increase the clarity of played human voices, and the low frequency effect channel signal LFE is directly outputted to the subwoofer driver so as to increase the punch of the low frequency band.

In some other exemplary embodiments, the multi-channel audio playback system 1 includes an independent subwoofer speaker and the front one-box speaker 12 comprises five drivers, wherein three of the drivers are front-firing drivers, and the other two drivers are upward-firing drivers. The two upward-firing drivers are used to increase the height of the sound field, and the independent subwoofer speaker is used to increase the punch of the low frequency band. As shown in FIG. 12, the front left channel signal FL and the front right channel signal FR are processed by the crosstalk cancellation module 1122, so that the crosstalk-cancelled front mixed left signal XFML and the crosstalk-cancelled front mixed right signal XFMR are generated; the front height left channel signal FHL and the front height right channel signal FHR are processed by the crosstalk cancellation module 1124, so that the crosstalk-cancelled front height left channel signal XFHL and the crosstalk-cancelled front height right channel XFHR are generated. Two of the three front-firing drivers of the front one-box speaker 12 are used to play the crosstalk-cancelled front mixed left signal XFML and the crosstalk-cancelled front mixed right signal XFMR, respectively, and the two upward-firing drivers of the front one-box speaker 12 are used to play the crosstalk-cancelled front height left signal XFHL and the crosstalk-cancelled front height right signal XFHR, respectively. The center channel signal C is directly outputted to the other front-firing driver of the front one-box speaker 12 so as to increase the clarity of played human voices, and the low frequency effect channel signal LFE is directly outputted to the independent subwoofer speaker so as to increase the punch of the low frequency band.

Figure 13:
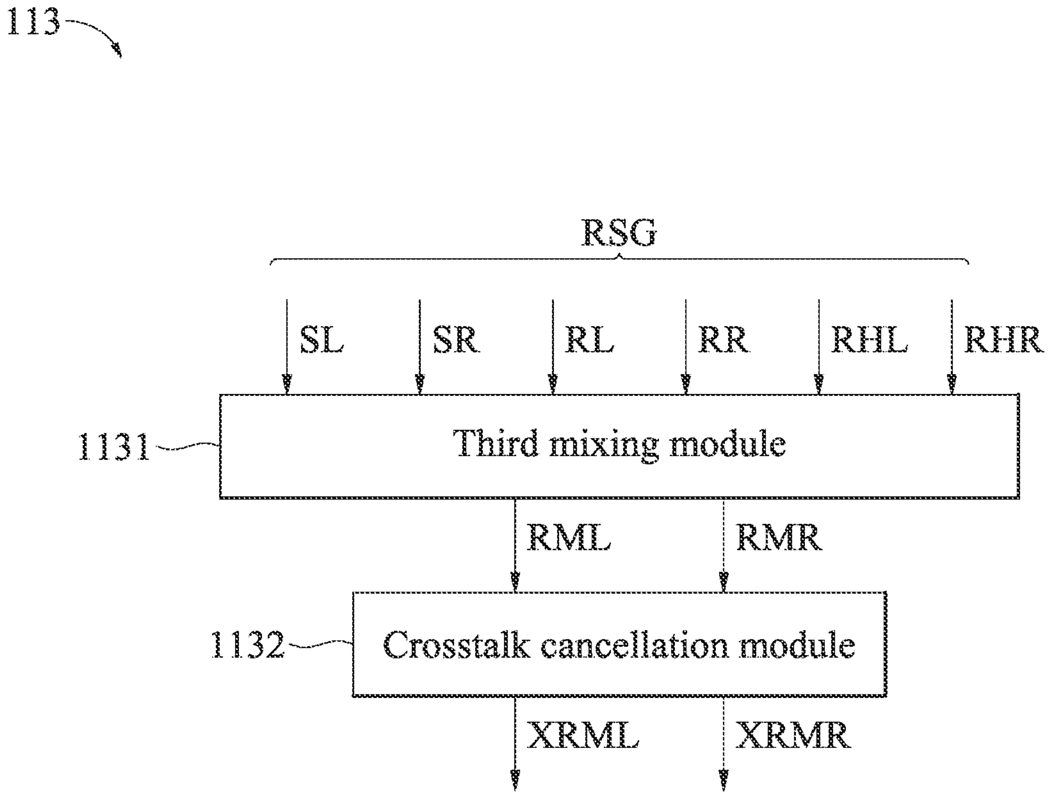
FIG. 13 and FIG. 14 illustrate schematic diagrams of rear sound field processing modules according to some exemplary embodiments of the instant disclosure.
Figure 14:
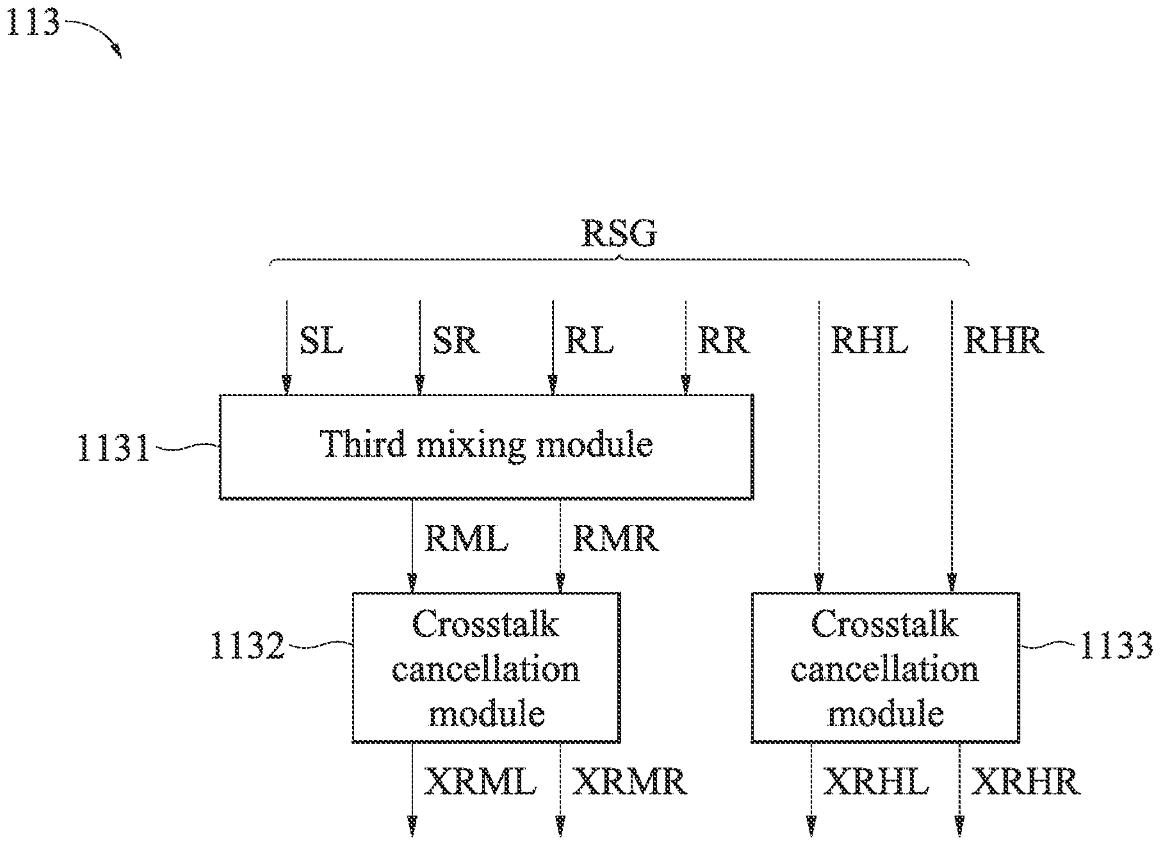

FIG. 13 and FIG. 14 illustrate schematic diagrams of rear sound field processing modules according to some exemplary embodiments of the instant disclosure. Please refer to FIG. 13. In this exemplary embodiment, the wearable speaker 13 comprises only two drivers. The rear sound field processing module 113 comprises a third mixing module 1131 and a crosstalk cancellation module 1132. The rear sound field signal group RSG comprises a side left channel signal SL, a side right channel signal SR, a rear left channel signal RL, a rear right channel signal RR, a rear height left channel signal RHL, and a rear height right channel signal RHR. The side left channel signal SL, the rear left channel signal RL, and the rear height left channel signal RHL are mixed to obtain a rear mixed left signal RML, and the side right channel signal SR, the rear right channel signal RR, and the rear height right channel signal RHR are mixed to obtain a rear mixed right signal RMR. Please refer to Equation 27 and Equation 28 below:

$$RML=SL+c1*RL+c2*RHL; \quad \text{(Equation 27)}$$

$$RMR=SR+c1*RR+c2*RHR, \quad \text{(Equation 28)}$$

where c1 and c2 are weights between 0 and 1.

Please refer to FIG. 14. In another exemplary embodiment, the wearable speaker 13 comprises four drivers. Two of the four drivers are used similarly as illustrated in the previous paragraph and thus are not repeated here, and the other two drivers can be used to play the rear height left channel signal RHL and the rear height right channel signal RHR (or a crosstalk-cancelled rear height left signal XRHL and a crosstalk-cancelled rear height right signal XRHR), respectively, so as to increase the height of the sound field. Please refer to Equation 29 through Equation 32 below:

$$RML=SL+c1*RL; \quad \text{(Equation 29)}$$

$$RMR=SR+c1*RR; \quad \text{(Equation 30)}$$

$$RML'=c2*RHL; \quad \text{(Equation 31)}$$

$$RMR'=c2*RHR, \quad \text{(Equation 32)}$$

where c1 and c2 are weights between 0 and 1 and may be identical or not identical, RHL' denotes the rear height left channel signal RHL or the rear height left channel signal RHL after volume adjustment, and RHR' denotes the rear height right channel signal RHR or the rear height right channel signal RHR after volume adjustment.

As previously illustrated, if the left (right) ear hears the sound emitted towards the right (left) ear, crosstalk interference occurs, and thus the sound field performance is degraded. This situation can easily occur when the neckband speaker is used. In order to cancel the crosstalk interruption between the left channel and the right channel, the rear mixed left signal RML and the rear mixed right signal RMR are inputted to the crosstalk cancellation module 1132, so that a crosstalk-cancelled rear mixed left signal XRML and a crosstalk-cancelled rear mixed right signal XRMR are generated. Similarly, for the exemplary embodiment shown in FIG. 14, crosstalk interruption may also happen for the rear height left channel signal RHL and the rear height right channel signal RHR. Consequently, the rear height left channel signal RHL and the rear height right channel signal RHR are inputted to the crosstalk cancellation module 1133, so that the crosstalk-cancelled rear height left channel signal XRHL and the crosstalk-cancelled rear height right channel signal XRHR are generated. Please refer to the exemplary embodiment shown in FIG. 8 for the implementation of crosstalk cancellation; the implementation of crosstalk cancellation will not be repeated here. In some other exemplary embodiments, crosstalk cancellation may also be applied to the wearable speaker 13 adopting a pair of bone conduction headphones, because the vibrations generated at the right (left) ear by the bone conduction headphones can be transmitted to the left (right) ear through the skull.

In some exemplary embodiments, the wearable speaker 13 may be a pair of open-back earphone. Although the open-back earphones allow the listener to hear ambient sounds, the sound emitted by one side of the earphones is hardly heard by the listener's opposite ear, and thus the crosstalk problem is less serious. However, using head-related transfer functions (HRTFs) to process the audio signals played by the open-back earphones will allow the audio signal to contain spatial cues such as the interaural time difference ITD and the interaural level difference ILD, so that sounds with spatiality can be emulated. The HRTF process is similar to a filtering process, in the sense that the HRTF process attenuates sounds from different directions with different extents, so that the shielding effect caused by human head and torso of sound waves in real situations can be emulated.

The HRTF process requires definition of positional angle of the sound source. The positional angle includes azimuth θ and elevation φ. The positional angle is used to determine head-related impulse response (HRIR) coefficients corresponding to the two ears in an HRTF database (such as CIPIC, MIT, and RIEC) for the filtering process. For some exemplary embodiments of the instant disclosure, when the wearable speaker 13 of the multi-channel audio playback system 1 adopts the open-back earphones, the side channels (RHL and RHR), the rear channels (RL and RR), and the height channels (RHL and RHR) are respectively filtered using corresponding head-related impulse response coefficients according to respective azimuths θ and elevations φ of desired directions of sound source.

Figure 15:
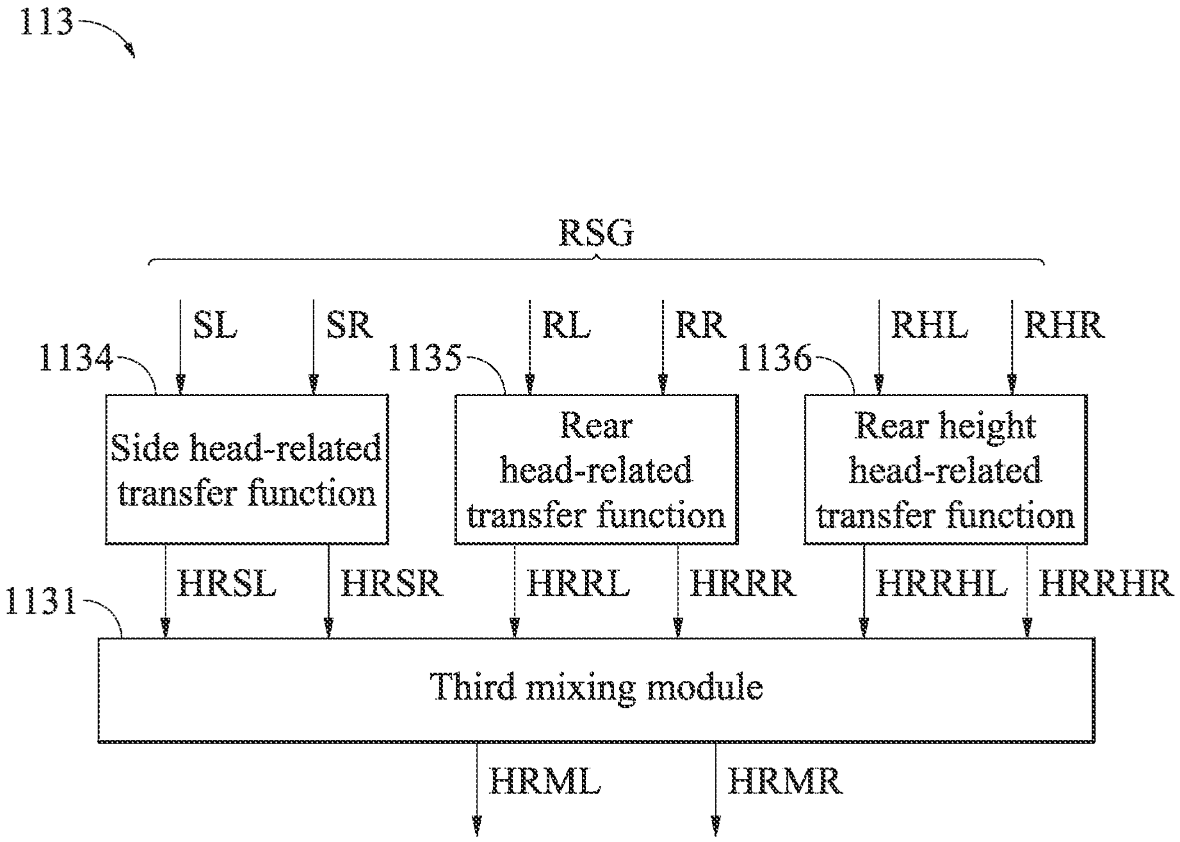
FIG. 15 and FIG. 16 illustrate schematic diagrams of rear sound field signals being processed based on head-related transfer functions according to some exemplary embodiments of the instant disclosure.

Please refer to FIG. 15. FIG. 15 illustrates a schematic diagram of rear sound field signals being processed based on head-related transfer functions according to some exemplary embodiments of the instant disclosure. In some exemplary embodiments, the wearable speaker 13 adopts the open-back earphones having two drivers, wherein each of the left side and the right side of the wearable speaker 13 has one driver. The side left channel signal SL and the side right channel signal SR are processed based on a side head-related transfer function 1134, so that a head-related transfer function-processed side left channel signal HRSL and a head-related transfer function-processed side right channel signal HRSR are generated. The rear left channel signal RL and the rear right channel signal RR are processed based on a rear head-related transfer function 1135, so that a head-related transfer function-processed rear left channel signal HRRL and a head-related transfer function-processed rear right channel signal HRRR are generated. The rear height left channel signal RHL and the rear height right channel signal RHR are processed based on a rear height head-related transfer function 1136, so that a head-related transfer function-processed rear height left channel signal HRRHL and a head-related transfer function-processed rear height right channel signal HRRHR are generated. The six signals generated based on the three head-related transfer functions are mixed by the third mixing module 1131, so that a head-related transfer function-processed rear mixed left signal HRML and a head-related transfer function-processed rear mixed right signal HRMR are generated. Please refer to Equation 33 through Equation 37 below:

$$(HRSL,HRSR)=HRTF1(SL,SR); \quad \text{(Equation 33)}$$

$$(HRRL,HRRR)=HRTF2(RL,RR); \quad \text{(Equation 34)}$$

$$(HRRHL,HRRHR)=HRTF3(RHL,RHR); \quad \text{(Equation 35)}$$

$$HRML=HRSL+c1*HRRL+c2*HRRHL; \quad \text{(Equation 36)}$$

$$HRMR=HRSR+c1*HRRR+c2*HRRHR, \quad \text{(Equation 37)}$$

where HRTF1 denotes the side head-related transfer function 1134, HRTF2 denotes the rear head-related transfer function 1135, HRTF3 denotes the rear height head-related transfer function 1136, c1 and c2 are weights between 0 and 1 and may be identical or not identical, and c1 and c2 represent mixing ratios of the head-related transfer function-processed rear left channel signal HRRL (the head-related transfer function-processed rear right channel signal HRRR) to the head-related transfer function-processed rear height left channel signal HRRHL (the head-related transfer function-processed rear height right channel signal HRRHR. Practical ranges of angles of the head-related transfer functions HRTF1, HRTF2, HRTF3 can be designed based on requirements. However, the relative relationships between the angles are designed based on the relative sideward, backward, and upward directions of the listener.

Figure 16:
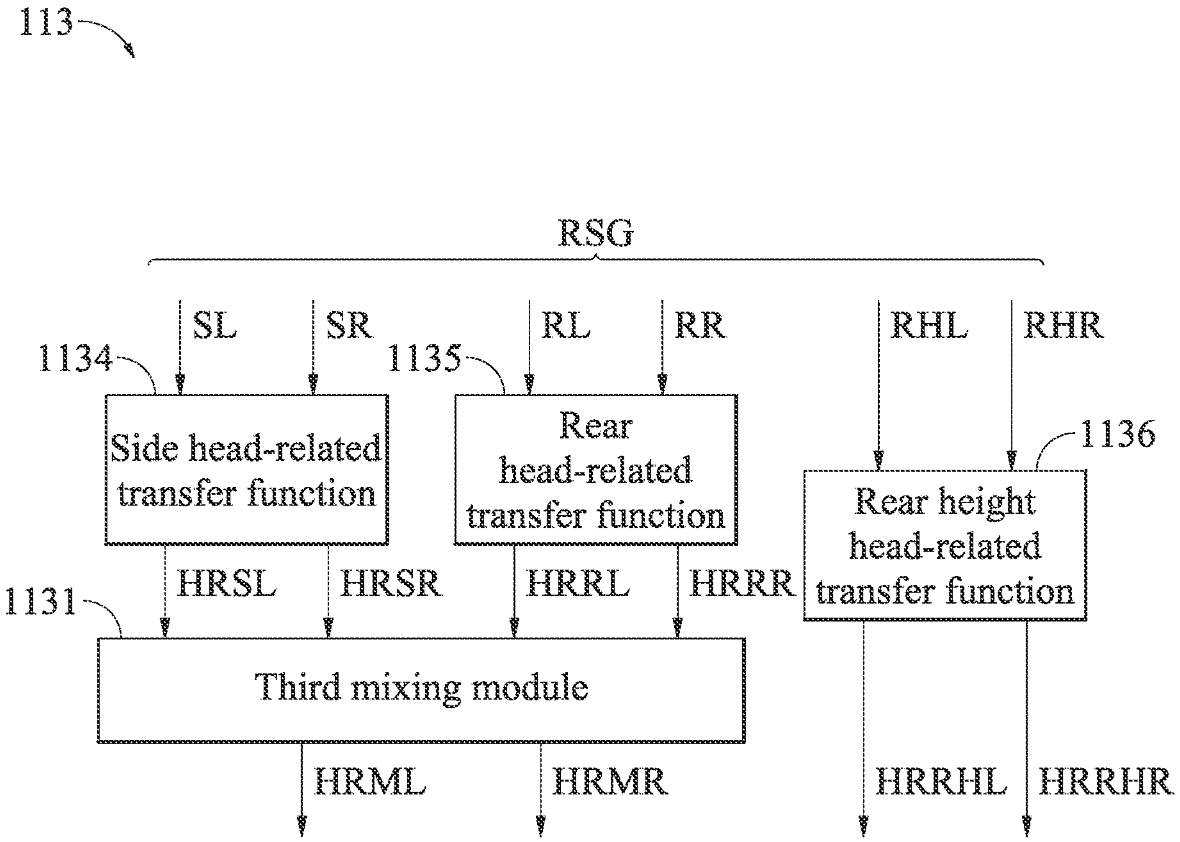

Please refer to FIG. 16. In another exemplary embodiment, the wearable speaker 13 adopts the open-back earphones having four drivers, wherein each of the left side and the right side of the wearable speaker 13 has two drivers. One of the two drivers on each side is used to play the head-related transfer function-processed and mixed side channels and rear channels, and the other driver on each side can be used to play the head-related transfer function-processed rear height left channel signal HRRHL and the head-related transfer function-processed rear height right channel signal HRRHR so as to increase the height of the sound field. Please refer to Equation 38 through Equation 42 below:

$$(HRSL,HRSR)=HRTF1(SL,SR); \quad \text{(Equation 38)}$$

$$(HRRL,HRRR)=HRTF2(RL,RR); \quad \text{(Equation 39)}$$

$$HRML=HRSL+c1*HRRL; \quad \text{(Equation 40)}$$

$$HRMR=HRSR+c1*HRRR. \quad \text{(Equation 41)}$$

$$(HRRHL,HRRHR)=HRTF3(RHL,RHR) \quad \text{(Equation 42)}$$

The features such as ratio relationships, structures, and sizes presented in the instant disclosure are only intended for illustration of the exemplary embodiments, so that persons skilled in the art can properly comprehend the instant disclosure, and thus are not intended to limit the scope of claims of the instant disclosure. The foregoing illustration outlines features of several embodiments so that those skilled in the art may better understand the aspects of the instant disclosure. Those skilled in the art should appreciate that they may readily use the instant disclosure as a basis for designing or modifying other processes and structures for carrying out the same purposes and/or achieving the same advantages of the embodiments introduced herein. Those skilled in the art should also realize that such equivalent constructions do not depart from the spirit and scope of the instant disclosure, and that they may make various changes, substitutions, and alterations herein without departing from the spirit and scope of the instant disclosure.

What is claimed is:

1. A multi-channel audio playback system comprising:

a front one-box speaker comprising at least two drivers configured to receive at least two front sound field signals;

a wearable speaker comprising at least two drivers, wherein the wearable speaker is designed to allow a listener to hear environmental sounds, and the wearable speaker is configured to receive at least two rear sound field signals; and a signal processor configured to:

receive a multi-channel signal;

divide the multi-channel signal into a front sound field signal group and a rear sound field signal group;

process the front sound field signal group to generate a plurality of front sound field signals, wherein the number of the front sound field signals is equal to the number of the drivers of the front one-box speaker;

process the rear sound field signal group to generate a plurality of rear sound field signals, wherein the number of the rear sound field signals is equal to the number of the drivers of the wearable speaker;

perform time delay adjustment on the front sound field signals or the rear sound field signals, so that a difference between a time for a sound wave emitted by the front one-box speaker to reach ears of the listener and a time for a sound wave emitted by the wearable speaker to reach the ears of the listener is less than a default value; and output the front sound field signals to the front one-box speaker and output the rear sound field signals to the wearable speaker.

2. The multi-channel audio playback system according to claim 1, wherein the front sound field signal group comprises two or more signals selected from the group consisting of a front left channel signal, a front right channel signal, a center channel signal, a low frequency effect channel signal, a front height left channel signal, and a front height right channel signal, the signal processor is configured to process and down-mix the front sound field signal group so as to reduce the number of channels and generate the front sound field signals.

3. The multi-channel audio playback system according to claim 2, wherein the signal processor is configured to generate a front mixed left signal and a front mixed right signal after the signal processor mixes the front sound field signal group, and the signal processor is further configured to perform crosstalk cancellation on the front mixed left signal and the front mixed right signal and then output the front sound field signals to the front one-box speaker.

4. The multi-channel audio playback system according to claim 1, wherein the rear sound field signal group comprises two or more signals selected from the group consisting of a side left channel signal, a side right channel signal, a rear left channel signal, a rear right channel signal, a rear height left channel signal, and a rear height right channel signal, the signal processor is configured to process and down-mix the rear sound field signal group so as to reduce the number of channels and generate the rear sound field signals.

5. The multi-channel audio playback system according to claim 4, wherein the wearable speaker is a neckband speaker or a pair of bone conduction headphones.

6. The multi-channel audio playback system according to claim 5, wherein the signal processor is configured to generate a rear mixed left signal and a rear mixed right signal after the signal processor mixes the rear sound field signal group, and the signal processor is further configured to perform crosstalk cancellation on the rear mixed left signal and the rear mixed right signal and then output the rear sound field signals to the neckband speaker or the bone conduction headphones.

7. The multi-channel audio playback system according to claim 4, wherein the wearable speaker is a pair of open-back earphone.

8. The multi-channel audio playback system according to claim 7, wherein the signal processor is configured to:

process the side left channel signal and the side right channel signal using a first head-related transfer functions (HRTFs); and process the rear left channel signal and the rear right channel signal using a second head-related transfer functions (HRTFs); and process the rear height left channel signal and the rear height right channel signal using a third head-related transfer functions (HRTFs); and down-mix the rear sound field signal group, which is processed by HRTFs, to generate a rear mixed left signal and a rear mixed right signal and then output the rear sound field signals to the pair of open-back earphone.

9. The multi-channel audio playback system according to claim 1, wherein the signal processor and the front one-box speaker are integrally configured with each other.

10. The multi-channel audio playback system according to claim 9, wherein the signal processor and the front one-box speaker are integrally configured into a display device.

11. The multi-channel audio playback system according to claim 1, wherein the signal processor is further configured to process the rear sound field signals based on an attenuation function before the signal processor outputs the rear sound field signals to the wearable speaker.

12. The multi-channel audio playback system according to claim 11, wherein the signal processor comprises a filter, the frequency response of the filter serves as the attenuation function, and a gain of the filter is less than 1.

13. A multi-channel audio playback system comprising:

a front one-box speaker comprising at least two drivers configured to receive at least two front sound field signals;

a subwoofer speaker configured to receive a low frequency effect channel signal;

a wearable speaker comprising at least two drivers, wherein the wearable speaker is designed to allow a listener to hear environmental sounds, and the wearable speaker is configured to receive at least two rear sound field signals; and a signal processor configured to:

receive a multi-channel signal;

divide the multi-channel signal into a front sound field signal group, a rear sound field signal group, and the low frequency effect channel signal;

process the front sound field signal group to generate a plurality of front sound field signals, wherein the number of the front sound field signals is equal to the number of the drivers of the front one-box speaker;

process the rear sound field signal group to generate a plurality of rear sound field signals, wherein the number of the rear sound field signals is equal to the number of the drivers of the wearable speaker;

perform time delay adjustment on the front sound field signals or the rear sound field signals so that a difference between a time for a sound wave emitted by the front one-box speaker to reach ears of the listener and a time for a sound wave emitted by the wearable speaker to reach the ears of the listener is less than a default value; and output the front sound field signals to the front one-box speaker, output the low frequency effect channel signal to the subwoofer speaker, and output the rear sound field signals to the wearable speaker.

* * * * *